(12) United States Patent
Lemmer et al.

(10) Patent No.: US 9,744,950 B1
(45) Date of Patent: Aug. 29, 2017

(54) PERFORMANCE ELECTRIC PARKING BRAKE CONTROLLERS

(71) Applicant: Ford Global Technologies, LLC, Dearborn, MI (US)

(72) Inventors: Brian Marvin Lemmer, Dearborn, MI (US); Curtis Hargitt, Howell, MI (US); Greg David Folta, Ann Arbor, MI (US); Chad Michael Korte, Grosse Ile, MI (US); Scott Mlynarczyk, South Lyon, MI (US); Alexander Ferencz, Canton, MI (US); Kevin Sallee, Ferndale, MI (US); Jason St. John, Canton, MI (US)

(73) Assignee: FORD GLOBAL TECHNOLOGIES, Dearborn, MI (US)

( * ) Notice: Subject to any disclaimer, the term of this patent is extended or adjusted under 35 U.S.C. 154(b) by 0 days.

(21) Appl. No.: 15/403,907

(22) Filed: Jan. 11, 2017

Related U.S. Application Data

(63) Continuation-in-part of application No. 15/231,964, filed on Aug. 9, 2016.

(51) Int. Cl.
    *B60T 7/02* (2006.01)
    *B60T 7/08* (2006.01)
    *B60T 13/74* (2006.01)

(52) U.S. Cl.
    CPC ............ *B60T 7/085* (2013.01); *B60T 13/741* (2013.01)

(58) Field of Classification Search
    CPC . B60T 7/12; B60T 7/042; B60T 7/085; B60T 17/221; B60T 13/662; B60T 13/741

USPC ............. 303/3, 7, 15, 20; 701/70–72; 188/156–164
    See application file for complete search history.

(56) References Cited

U.S. PATENT DOCUMENTS

| 5,489,246 A | 2/1996 | Moody et al. |
| 6,513,632 B2 | 2/2003 | Peter |
| 6,648,107 B2 | 11/2003 | Lundholm et al. |

(Continued)

FOREIGN PATENT DOCUMENTS

| EP | 0978432 | 2/2000 |
| EP | 1179462 | 10/2007 |

(Continued)

*Primary Examiner* — Christopher Schwartz
(74) *Attorney, Agent, or Firm* — Hanley, Flight & Zimmerman, LLC

(57) ABSTRACT

Performance electric parking brake controllers determine braking control signals for a performance electric parking brake system based on a position of a parking brake lever. A parking brake lever has a first rate of resistance associated with movement in a first direction away from a neutral position and a second rate of resistance associated with movement in a second direction away from the neutral position opposite the first direction. The first and second rates of resistance are different. A controller is configured to electromechanically actuate rear brake calipers of the vehicle in response to a first set of operating conditions of the vehicle, to hydraulically actuate front brake calipers and the rear brake calipers of the vehicle in response to a second set of operating conditions of the vehicle, and to hydraulically actuate only the rear brake calipers in response to a third set of operating conditions of the vehicle.

20 Claims, 11 Drawing Sheets

(56) References Cited

U.S. PATENT DOCUMENTS

| | | | |
|---|---|---|---|
| 7,021,415 B2 * | 4/2006 | Farmer | B60T 13/741 |
| | | | 180/275 |
| 7,731,627 B2 | 6/2010 | Shimizu et al. | |
| 9,242,624 B2 | 1/2016 | Huennekens et al. | |
| 2003/0006726 A1 * | 1/2003 | Weiberle | B60T 13/662 |
| | | | 318/370 |
| 2006/0197374 A1 * | 9/2006 | Jez | B60T 7/085 |
| | | | 303/20 |
| 2013/0282249 A1 * | 10/2013 | Heise | B60T 7/042 |
| | | | 701/70 |

FOREIGN PATENT DOCUMENTS

| | | |
|---|---|---|
| EP | 1179463 | 10/2007 |
| EP | 2483113 | 8/2015 |

\* cited by examiner

PERFORMANCE ELECTRIC PARKING BRAKE CONTROLLERS

RELATED APPLICATIONS

This patent arises from a continuation-in-part of U.S. patent application Ser. No. 15/231,964, filed Aug. 9, 2016, entitled "Performance Electric Parking Brake Controllers," the entirety of which is hereby incorporated herein by reference.

FIELD OF THE DISCLOSURE

This disclosure relates generally to parking brake controllers and, more particularly, to performance electric parking brake controllers.

BACKGROUND

Conventional mechanical parking brake systems are configured such that, when the driver activates (e.g., pulls upward on) a parking brake lever coupled via a cable to the rear brakes of the vehicle, a braking force is applied to the rear wheels via the rear brakes. In such conventional mechanical parking brake systems, the amount, degree and/or extent of the applied braking force is based on the position at which the parking brake lever is held by the driver.

Conventional electric parking brake systems are configured such that, when the driver activates (e.g., pulls upward on) a parking brake switch while driving, the vehicle is steadily slowed and/or brought to a controlled stop using the hydraulic control unit of the vehicle to provide hydraulic pressure to all four wheels of the vehicle. Such electric parking brake systems fail to include characteristics and/or capabilities that enable the system to perform in a manner that mimics the performance of a conventional mechanical parking brake system.

SUMMARY

Performance electric parking brake controllers and performance electric parking brake systems are disclosed. In some examples, an apparatus is disclosed. In some disclosed examples, the apparatus comprises a parking brake lever. In some disclosed examples, the parking brake lever has a first rate of resistance associated with moving the parking brake lever in a first direction away from a neutral position, and a second rate of resistance associated with moving the parking brake lever in a second direction away from the neutral position opposite the first direction. In some disclosed examples, the second rate of resistance is different from the first rate of resistance. In some disclosed examples, the apparatus further comprises a controller to be controlled based on a position of the parking brake lever. In some disclosed examples, the controller is configured to electromechanically actuate rear brake calipers of a vehicle in response to a first set of operating conditions of the vehicle. In some disclosed examples, the controller is further configured to hydraulically actuate front brake calipers and the rear brake calipers of the vehicle in response to a second set of operating conditions of the vehicle. In some disclosed examples, the controller is further configured to hydraulically actuate only the rear brake calipers in response to a third set of operating conditions of the vehicle.

In some examples, a method for controlling an electric parking brake system of a vehicle based on a position of a parking brake lever is disclosed. In some disclosed examples, the method comprises providing a first rate of resistance in response to moving the parking brake lever in a first direction away from a neutral position. In some disclosed examples, the method further comprises providing a second rate of resistance in response to moving the parking brake lever in a second direction away from the neutral position opposite the first direction. In some disclosed examples, the second rate of resistance is different from the first rate of resistance. In some disclosed examples, the method further comprises electromechanically actuating, by executing one or more instructions with a controller, rear brake calipers of the vehicle in response to a first set of operating conditions of the vehicle. In some disclosed examples, the method further comprises hydraulically actuating, by executing one or more instructions with the controller, front brake calipers and the rear brake calipers of the vehicle in response to a second set of operating conditions of the vehicle. In some disclosed examples, the method further comprises hydraulically actuating, by executing one or more instructions with the controller, only the rear brake calipers in response to a third set of operating conditions of the vehicle.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Unlike conventional electric parking brake systems, the PEPB controllers and/or PEPB systems disclosed herein advantageously provide performance-based driving characteristics traditionally associated with mechanical parking brake systems. For example, the disclosed PEPB controllers and/or PEPB systems advantageously provide for a driver of a vehicle who selects a performance-based driving mode for the vehicle to control the application of variable braking forces to the rear wheels of the vehicle via a driver-positionable parking brake lever in communication with the PEPB controller of the PEPB system.

A first rate of resistance is associated with (e.g., encountered, experienced and/or felt by a driver of the vehicle when) moving the parking brake lever in a first direction away from a neutral position. A second rate of resistance different from the first rate of resistance is associated with (e.g., encountered, experienced and/or felt by a driver of the vehicle when) moving the parking brake lever in a second direction opposite the first direction away from the neutral position. The implementation of different rates of resistance associated with different ranges of movement of the parking brake lever advantageously enables the parking brake lever to provide a user (e.g., a driver) applying a force (e.g., pushing or pulling) to a free end of the parking brake lever with tactile and/or haptic feedback and/or control information corresponding to the specific position of the parking brake lever relative to the available range of motion of the parking brake lever, and/or corresponding to engagement of the PEPB system.

Figure 1:
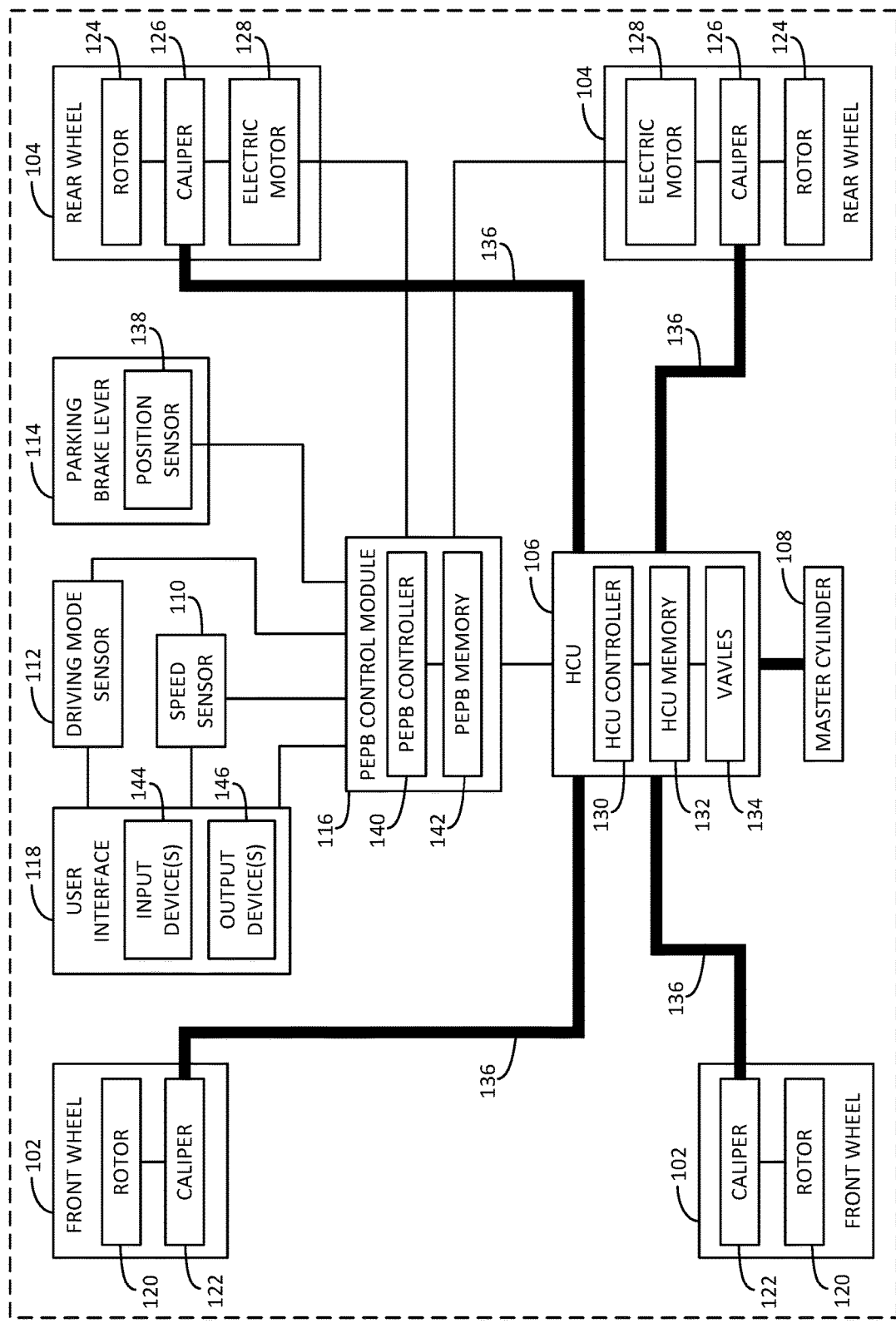
FIG. 1 is a block diagram of an example performance electric parking brake (PEPB) system constructed in accordance with the teachings of this disclosure.
Figure 2:
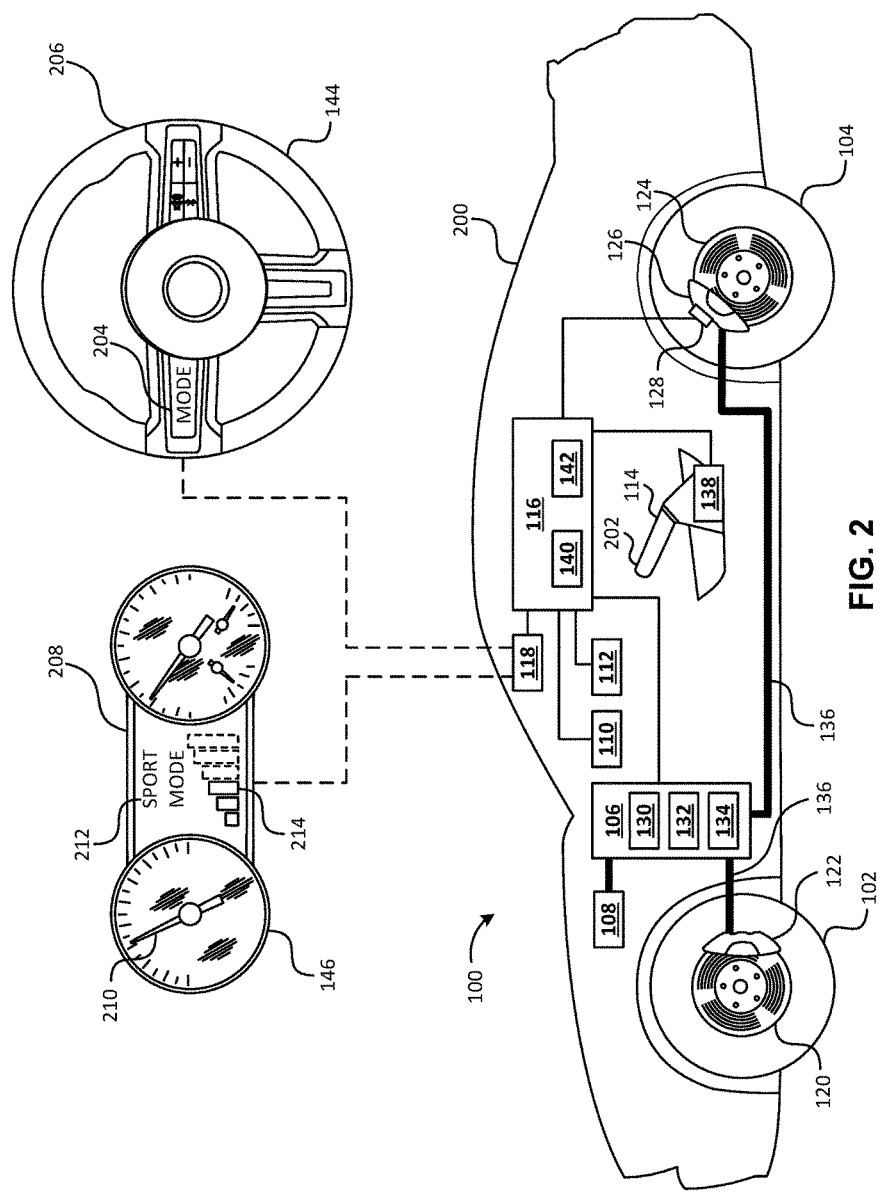
FIG. 2 illustrates the example PEPB system of FIG. 1 implemented in an example vehicle.

FIG. 1 is a block diagram of an example PEPB system 100 constructed in accordance with the teachings of this disclosure. FIG. 2 illustrates the example PEPB system 100 of FIG. 1 implemented in an example vehicle 200. In the illustrated examples of FIGS. 1 and 2, the PEPB system 100, and/or, more generally, the vehicle 200 includes example front wheels 102, example rear wheels 104, an example hydraulic control unit (HCU) 106, an example master cylinder 108, an example speed sensor 110, an example driving mode sensor 112, an example parking brake lever 114, an example PEPB control module 116, and an example user interface 118. However, other example implementations of the PEPB system 100 may include fewer or additional structures in accordance with the teachings of this disclosure. The front wheels 102, rear wheels 104, HCU 106, master cylinder 108, speed sensor 110, driving mode sensor 112, parking brake lever 114, PEPB control module 116, and user interface 118 of the PEPB system 100 of FIGS. 1 and 2 may be of any size(s), shape(s) and/or configuration(s) that enable(s) the PEPB system 100 to be implemented in and/or on a vehicle such as the example vehicle 200 of FIG. 2.

The example front wheels 102 of FIGS. 1 and 2 are respectively coupled (either directly or indirectly) to a body and/or subframe of a vehicle (e.g., the vehicle 200 of FIG. 2) via one or more shafts, rods and/or axles (not shown) thereof. The front wheels 102 may be of any size, shape and/or configuration. The PEPB system 100 of FIGS. 1 and 2, and/or, more generally, the vehicle 200 of FIG. 2 may include any number of front wheels 102, including a single front wheel.

Respective ones of the front wheels 102 of FIGS. 1 and 2 include corresponding ones of example front wheel rotors 120 and corresponding ones of example front wheel brake calipers 122. The speed at which the front wheel rotors 120, and/or, more generally, the front wheels 102 rotate may be restricted and/or reduced by the application of braking forces to the front wheel rotors 120 via the front wheel brake calipers 122. For example, the front wheel brake calipers 122 may be hydraulically actuated via the HCU 106 of FIGS. 1 and 2 to cause brake pads (not shown) of the front wheel brake calipers 122 to press against the front wheel rotors 120 of the front wheels 102. This results in a slowing (e.g., deceleration) and/or stopping of the rotation of the front wheel rotors 120, and/or, more generally, the front wheels 102. As described below, the degree and/or extent to which the front wheel brake calipers 122 are hydraulically actuated is dependent upon a pressure of a hydraulic fluid delivered to the front wheel brake calipers 122 via the HCU 106, which in turn is dependent upon one or more braking control signal(s) provided to the HCU 106 via the PEPB control module 116. As used herein, the term "hydraulically actuate" refers to an actuation process by which an electronic signal (e.g., a braking control signal provided by the PEPB control module 116) generates and/or is converted into a corresponding pressure of a pressurized hydraulic fluid, whereby the pressurized hydraulic fluid causes mechanical movement of a target structure (e.g., a brake caliper) to which the pressurized hydraulic fluid is supplied.

The example rear wheels 104 of FIGS. 1 and 2 are respectively coupled (either directly or indirectly) to a body and/or subframe of a vehicle (e.g., the vehicle 200 of FIG. 2) via one or more shafts, rods and/or axes (not shown) thereof. The rear wheels 104 may be of any size, shape and/or configuration. The PEPB system 100 of FIGS. 1 and 2, and/or, more generally, the vehicle 200 of FIG. 2 may include any number of rear wheels 104, including a single rear wheel.

Respective ones of the rear wheels 104 of FIGS. 1 and 2 include corresponding ones of example rear wheel rotors 124, corresponding ones of example rear wheel brake calipers 126, and corresponding ones of rear wheel brake caliper electric motors 128. The speed at which the rear wheel rotors 124, and/or, more generally, the rear wheels 104 rotate may be restricted and/or reduced by the application of braking forces to the rear wheel rotors 124 via the rear wheel brake calipers 126. For example, the rear wheel brake calipers 126 may be hydraulically actuated via the HCU 106 of FIGS. 1 and 2 to cause brake pads (not shown) of the rear wheel brake calipers 126 to press against the rear wheel rotors 124 of the rear wheels 104. This results in a slowing (e.g., deceleration) and/or stopping of the rotation of the rear wheel rotors 124, and/or, more generally, the rear wheels 104. As described below, the degree and/or extent to which the rear wheel brake calipers 126 are hydraulically actuated is dependent upon a pressure of a hydraulic fluid delivered to the rear wheel brake calipers 126 via the HCU 106, which in turn is dependent upon one or more braking control signal(s) provided to the HCU 106 via the PEPB control module 116.

In some examples, the rear wheel brake calipers 126 may additionally and/or alternatively be electromechanically actuated via the rear wheel brake caliper electric motors 128 of FIGS. 1 and 2 to cause the brake pads of the rear wheel brake calipers 126 to press against the rear wheel rotors 124 of the rear wheels 104. This may result in application of a clamping force to the rear wheel rotors 124, and/or, more generally, the rear wheels 104. In some examples, the applied clamping force may be of sufficient strength to effectively lock the rear wheel rotors 124, and/or, more generally, the rear wheels 104 in place such that the rear wheel rotors 124 and/or the rear wheels 104 are unable to rotate until the clamping force is released and/or relieved. As described below, the degree and/or extent to which the rear wheel brake calipers 126 are electromechanically actuated is dependent upon one or more braking control signal(s) provided to the rear wheel brake caliper electric motors 128 via the PEPB control module 116. As used herein, the term "electromechanically actuate" refers to an actuation process by which an electronic signal (e.g., a braking control signal provided by the PEPB control module 116) generates and/or is converted into a corresponding force exerted by a solid (e.g., non-fluid) structure, whereby the force causes mechanical movement of a target structure (e.g., a brake caliper) to which the force is applied. Thus, the term "electromechanically actuate" does not encompass the term "hydraulically actuate."

The example HCU 106 of FIGS. 1 and 2 manages and/or controls the supply of hydraulic fluid to the front wheel brake calipers 122 of the front wheels 102 and to the rear wheel brake calipers 126 of the rear wheels 104. Hydraulic fluid to be supplied by the HCU 106 to the front wheel brake calipers 122 and/or the rear wheel brake calipers 126 is supplied to the HCU 106 via the master cylinder 108. In some examples, one or more hydraulic pump(s) (not shown) may assist in pressurizing and/or supplying hydraulic fluid from the master cylinder 108 to the HCU 106, and or from the HCU 106 to the front wheel brake calipers 122 and/or the rear wheel brake calipers 126. In the illustrated examples of FIGS. 1 and 2, the HCU 106 includes an example HCU controller 130, an example HCU memory 132, and example valves 134.

The HCU controller 130 of FIGS. 1 and 2 may be implemented by a semiconductor device such as a microprocessor, controller or microcontroller. Based on one or more braking control signal(s) received by the HCU controller 130, and/or, more generally, by the HCU 106 from the PEPB control module 116, the HCU controller 130 actuates one or more valve(s) 134 of the HCU 106 to cause a controlled pressure of hydraulic fluid to be provided to corresponding ones of the front wheel brake calipers 122 and/or to corresponding ones of the rear wheel brake calipers 126, as indicated by the braking control signal(s). In response to the actuation of the one or more valve(s) 134, the determined pressure of hydraulic fluid is delivered to the front wheel brake calipers 122 and/or rear wheel brake calipers 126 via one or more corresponding hydraulic fluid supply line(s) 136.

For example, the HCU controller 130 may obtain (either directly from the PEPB control module 116, or by accessing the HCU memory 132) a braking control signal indicating that fifteen percent (15%) of the maximum available hydraulic pressure associated with the hydraulic fluid should be provided via corresponding ones of hydraulic fluid supply lines 136 to the front wheel brake calipers 122 and to the rear wheel brake calipers 126. In response to such a braking control signal, the HCU controller 130 actuates one or more of the valve(s) 134 to cause the hydraulic fluid to be provided, via the corresponding ones of the hydraulic fluid supply lines 136, to the front wheel brake calipers 122 and to the rear wheel brake calipers 126 at a pressure corresponding to the instruction provided by the braking control signal.

As another example, the HCU controller 130 may obtain (either directly from the PEPB control module 116, or by accessing the HCU memory 132) a braking control signal indicating that forty percent (40%) of the maximum available hydraulic pressure associated with the hydraulic fluid should be provided via corresponding ones of the hydraulic fluid supply lines 136 to the rear wheel brake calipers 126 only. In response to such a braking control signal, the HCU controller 130 actuates one or more of the valve(s) 134 to cause the hydraulic fluid to be provided, via the corresponding ones of the hydraulic fluid supply lines 136, to the rear wheel brake calipers 126 at a pressure corresponding to the instruction provided by the braking control signal.

The HCU memory 132 of FIGS. 1 and 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the HCU memory 132 may be stored in any file and/or data structure format, organization scheme, and/or arrangement. Braking control signals received by the HCU controller 130, and/or, more generally, by the HCU 106 may be stored in the HCU memory 132. The HCU memory 132 is accessible to the HCU controller 130 of FIGS. 1 and 2, and/or, more generally, to the HCU 106 of FIGS. 1 and 2.

The valves 134 of the HCU 106 of FIGS. 1 and 2 may be implemented as electromechanically operated solenoid valves. The valves 134 function as switches controllable via the HCU controller 130 of the HCU 106 to turn on, turn off, and/or otherwise distribute a flow of hydraulic fluid to corresponding ones of the front wheel brake calipers 122 of the front wheels 102 and/or corresponding ones of the rear wheel brake calipers 126 of the rear wheels 104.

The example speed sensor 110 of FIGS. 1 and 2 senses, measures and/or detects a speed at which one or more of the front wheels 102 and/or rear wheels 104 of a vehicle (e.g., the vehicle 200 of FIG. 2) is/are rotating. The speed sensor 110 correlates and translates the sensed, measured and/or detected speed of rotation of the one or more of the front wheels 102 and/or rear wheels 104 into a vehicle speed corresponding to the speed at which the vehicle 200 is traveling. The PEPB system 100 may include any number of speed sensors 110, including a single speed sensor. In some examples, the speed sensor 110 may be implemented as a vehicle speed sensor (VSS) coupled to the transmission and/or transaxle (not shown) of the vehicle 200. In other examples, the speed sensor 110 may be implemented as one or more wheel speed sensors (WSS) coupled to corresponding ones of the front wheels 102 and/or or rear wheels 104 of the vehicle 200. In the illustrated examples of FIGS. 1 and 2, the vehicle speed sensed, measured and/or detected by the speed sensor 110 is provided to and/or made accessible to the PEPB control module 116.

The example driving mode sensor 112 of FIGS. 1 and 2 senses and/or detects a selectable driving mode of a vehicle (e.g., the vehicle 200 of FIG. 2). For example, the driving mode sensor 112 may detect that the vehicle 200 has been set to one of a normal driving mode, a comfort driving mode, an economy driving mode, a sport driving mode or a track driving mode. In some examples, the driving mode sensor 112 senses and/or detects the driving mode of the vehicle based on one or more signal(s) and/or command(s) generated by the user interface 118 of the PEPB system 100 in response to one or more user input(s) to the user interface 118. In the illustrated examples of FIGS. 1 and 2, the vehicle driving mode sensed, measured and/or detected by the driving mode sensor 112 is provided to and/or made accessible to the PEPB control module 116.

The example parking brake lever 114 of FIGS. 1 and 2 is mounted within a vehicle (e.g., the vehicle 200 of FIG. 2) and is movable over a range of positions. In some examples, the parking brake lever 114 is pivotally coupled at a fixed end (not shown) to a frame and/or body (not shown) of the vehicle 200 such that a free end 202 of the parking brake lever 114 is rotatable about a pivot point (not shown) of the fixed end. In some examples, the parking brake lever 114 is mechanically biased (e.g., by a spring) to a neutral position. In such examples, the parking brake lever 114 will remain at and/or return to the neutral position in the absence of an application of force (e.g., pushing or pulling) to the free end 202 of the parking brake lever 114 by a user (e.g., a driver) positioned within the vehicle 200.

In some examples, a first rate of resistance is associated with (e.g., encountered, experienced and/or felt by a driver of the vehicle when) moving the parking brake lever 114 in a first direction away from the neutral position. In some examples, a second rate of resistance different from the first rate of resistance is associated with (e.g., encountered, experienced and/or felt by a driver of the vehicle when) moving the parking brake lever 114 in a second direction away from the neutral position opposite the first direction. In some examples, the second rate of resistance is greater than the first rate of resistance. In other examples, the second rate of resistance is less than the first rate of resistance. In some examples, one or both of the first and/or second rate(s) of resistance may be a variable rate of resistance that increases as the parking brake lever 114 is moved further away from the neutral position.

Respective ones of the first and second rates of resistance may be implemented via one or more springs (e.g., a variable rate spring, a dual rate spring, etc.) and/or resilient structures coupled (either directly or indirectly) to the parking brake lever 114. The implementation of different rates of resistance associated with different ranges of movement of the parking brake lever 114 enables the parking brake lever 114 to provide a user (e.g., a driver) applying a force (e.g., pushing or pulling) to the free end 202 of the parking brake lever 114 with tactile and/or haptic feedback and/or control information corresponding to the specific position of the parking brake lever 114 relative to the available range of motion of the parking brake lever 114, and/or corresponding to engagement of the PEPB system 100.

The parking brake lever 114 of FIGS. 1 and 2 includes an example position sensor 138 that senses, measures and/or detects a position (e.g., an angular position and/or angular displacement) of the parking brake lever 114. For example, the position sensor 138 may sense, measure and/or detect that the parking brake lever 114 is in the neutral position, in one or more position(s) deviating upward from the neutral position (e.g., a brake activation position), or in one or more position(s) deviating downward from the neutral position (e.g., a brake release position). In the illustrated examples of FIGS. 1 and 2, the position of the parking brake lever 114 sensed, measured and/or detected by the position sensor 138 is provided to and/or made accessible to the PEPB control module 116.

Figure 3:
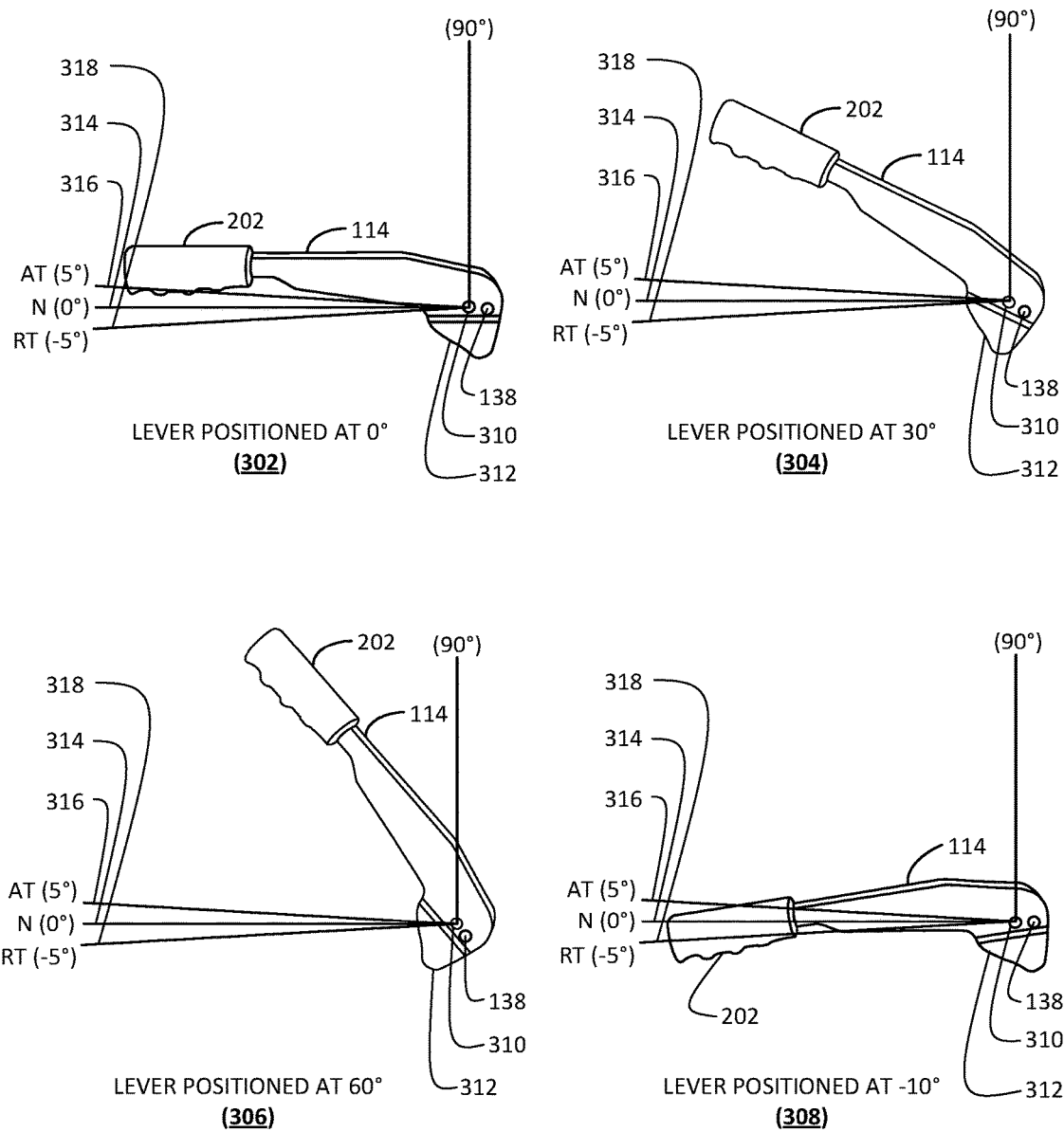
FIG. 3 illustrates the example parking brake lever of FIGS. 1 and 2 positioned in respective ones of first, second, third and fourth example positions.

FIG. 3 illustrates the parking brake lever 114 of FIGS. 1 and 2 positioned in respective ones of a first example position 302, a second example position 304, a third example position 306 and a fourth example position 308. In the illustrated example of FIG. 3, the free end 202 of the parking brake lever 114 is rotatable between a range of negative ten degrees (−10°) and sixty degrees (60°) about an example pivot point 310 to which an example fixed end 312 of the parking brake lever 114 is pivotally coupled. In other examples, the free end 202 of the parking brake lever 114 may be rotatable between a range that is narrower than, broader than, and/or shifted relative to the range described in the example of FIG. 3. In the example of FIG. 3, the first example position 302 illustrates the parking brake lever 114 positioned at an angle of approximately zero degrees (0°). The second example position 304 illustrates the parking brake lever 114 positioned at an angle of approximately thirty degrees (30°). The third example position 306 illustrates the parking brake lever 114 positioned at an angle of approximately sixty degrees (60°). The fourth example position 308 illustrates the parking brake lever 114 positioned at an angle of approximately negative ten degrees (−10°). The position sensor 138 of the parking brake lever 114 senses, measures and/or detects respective ones of the first, second, third and fourth example positions 302, 304, 306, 308 of the parking brake lever 114 and provides data corresponding to the detected first, second, third and fourth example positions 302, 304, 306, 308 to the PEPB control module 116.

FIG. 3 further illustrates, in a superimposed manner relative to the illustrated parking brake lever 114, angular indications corresponding respectively to an example neutral position (N) 314 associated with the parking brake lever 114, an example activation position threshold (AT) 316 associated with the parking brake lever 114, and an example release position threshold (RT) 318 associated with the parking brake lever 114. In the illustrated example of FIG. 3, the neutral position 314 lies at an angle of approximately zero degrees (0°) and is indicative of the position to which the parking brake lever 114 is biased in the absence of an application of force (e.g., pushing or pulling) to the free end 202 of the parking brake lever 114 by a user. For example, if a user moves the parking brake lever 114 from the first example position 302 (e.g., zero degrees (0°)) to the second example position 304 (e.g., thirty degrees (30°)) and subsequently releases the parking brake lever 114, the parking brake lever 114 will automatically return to the first example position 302 (e.g., zero degrees (0°)) as a result of the biasing forces acting on the parking brake lever 114.

In the illustrated example of FIG. 3, the activation position threshold 316 lies at an angle of approximately five degrees (5°) and is indicative of a minimal angular position in a first direction relative to the neutral position 314 to which the parking brake lever 114 must be displaced and/or rotated to cause the PEPB control module 116 to generate one or more braking control signal(s) associated with actuating one or more of the front wheel brake calipers 122 and/or rear wheel brake calipers 126. The release position threshold 318 lies at an angle of approximately negative five degrees (−5°) and is indicative of a minimal angular position in a second direction relative to the neutral position 314 opposite the first direction to which the parking brake lever 114 must be displaced and/or rotated to cause the PEPB control module 116 to generate one or more braking control signal(s) associated with releasing one or more of the front wheel brake calipers 122 and/or rear wheel brake calipers 126. Accordingly, the neutral position 314 to which the parking brake lever 114 is biased satisfies neither the activation position threshold 316 nor the release position threshold 318.

In other examples, one or more of the neutral position 314, the activation position threshold 316 and/or the release position threshold 318 of the parking brake lever 114 may lie at an angle that differs from that illustrated in the example of FIG. 3. As further described below, the respective angular positions of the parking brake lever 114 corresponding to the neutral position 314, the activation position threshold 316 and/or the release position threshold 318 may be stored by the PEPB control module 116 of FIGS. 1 and 2.

Figure 4:
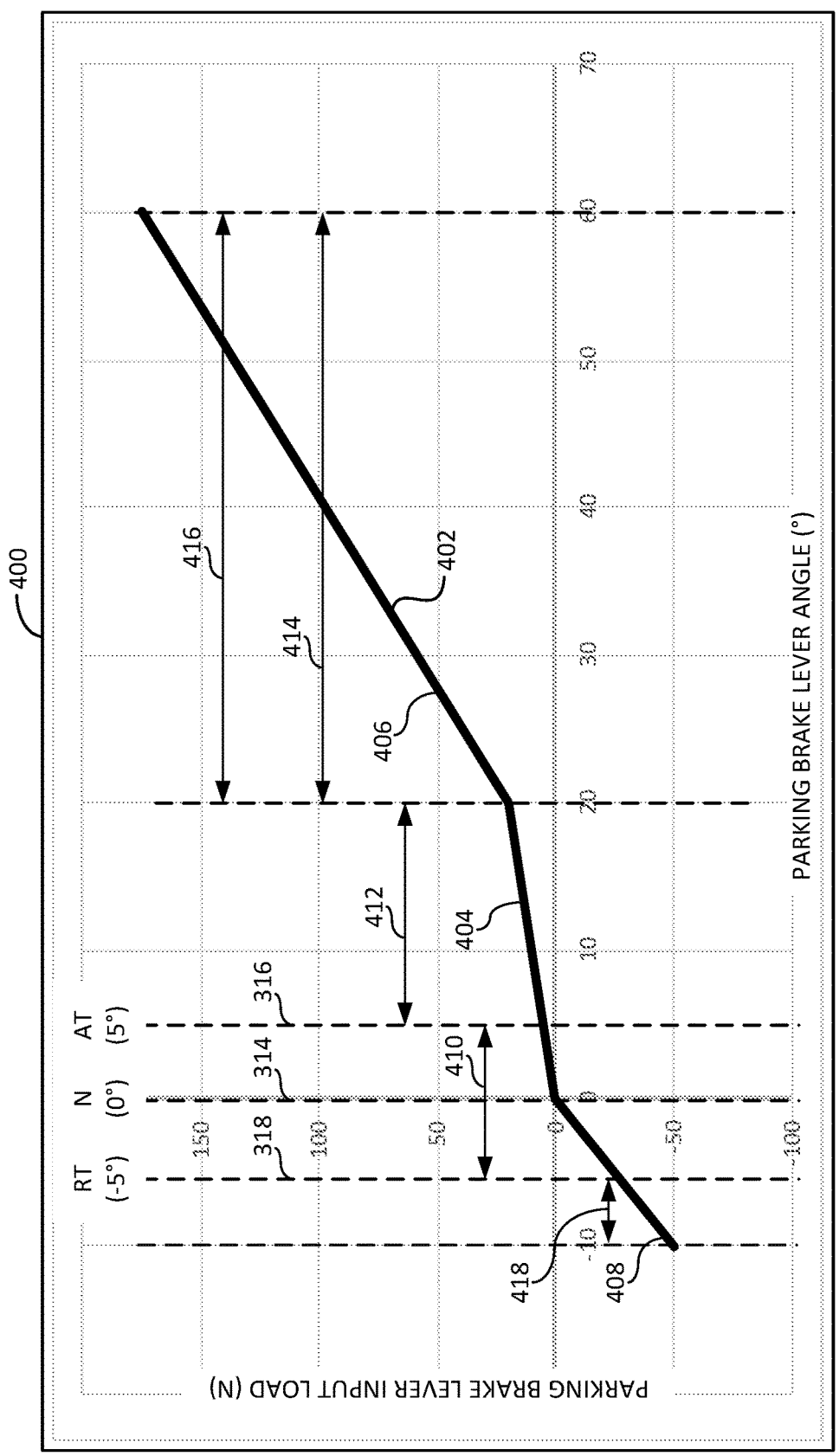
FIG. 4 is an example graph illustrating a first example plot of input load versus angle of the example parking brake lever of FIGS. 1-3.

FIG. 4 is an example graph 400 illustrating a first example plot 402 of input load versus angle of the parking brake lever 114 of FIGS. 1-3. Different slopes of the plot 402 of FIG. 4 are indicative of different rates of resistance associated with (e.g., encountered, experienced and/or felt by a driver of the vehicle when) moving the parking brake lever 114 at and/or to a specific angular position. The graph 400 of FIG. 4 includes lines corresponding to the neutral position 314, the activation position threshold 316 and the release position threshold 318 of the parking brake lever 114.

In the illustrated example of FIG. 4, a first example rate of resistance 404 and/or a second example rate of resistance 406 is/are associated with (e.g., encountered, experienced and/or felt by a driver of the vehicle when) moving the parking brake lever 114 in a first direction away from the neutral position 314. The first rate of resistance 404 is associated with (e.g., encountered, experienced and/or felt by a driver of the vehicle when) moving the parking brake lever 114 from the neutral position 314 (zero degrees (0°)) to an angular position of approximately twenty degrees (20°). The second rate of resistance 406 is associated with (e.g., encountered, experienced and/or felt by a driver of the vehicle when) moving the parking brake lever 114 from an angular position of approximately twenty degrees (20°) to an angular position of approximately sixty degrees (60°). A third example rate of resistance 408 different from the first rate of resistance 404 is associated with (e.g., encountered, experienced and/or felt by a driver of the vehicle when) moving the parking brake lever 114 in a second direction away from the neutral position 314 opposite the first direction. The third rate of resistance 408 is associated with (e.g., encountered, experienced and/or felt by a driver of the vehicle when) moving the parking brake lever 114 from the neutral position 314 (zero degrees (0°)) to an angular position of approximately negative ten degrees (−10°).

In the illustrated example of FIG. 4, the first rate of resistance 404 is less than the second rate of resistance 406 and less than the third rate of resistance 408. The second rate of resistance 406 is greater than the first rate of resistance 404 and less than the third rate of resistance 408. The third rate of resistance 408 is greater than the first rate of resistance 404 and greater than the second rate of resistance 406.

In the illustrated example of FIG. 4, respective ones of the first, second and third resistance rates 404, 406, 408 correspond to (e.g., are correlated with) one or more state(s) and/or function(s) of the PEPB system 100. Accordingly, the first, second and third resistance rates 404, 406, 408 provide a user (e.g., a driver) applying a force (e.g., pushing or pulling) to the free end 202 of the parking brake lever 114 with tactile and/or haptic feedback and/or control information corresponding to a specific state and/or function of the PEPB system 100.

For example, the plot 402 of FIG. 4 includes an example idle zone 410, a first example activation zone 412, a second example activation zone 414, a first example release zone 416, and a second example release zone 418. The idle zone 410 of FIG. 4 extends from the release position threshold 318 (negative five degrees (−5°)) to the activation position threshold 316 (five degrees (5°)). The idle zone 410 corresponds to an idle state and/or a lack of change in the control function(s) of the PEPB system 100.

The first activation zone 412 of FIG. 4 extends from the activation position threshold 316 (five degrees (5°)) to a point of transition between the first resistance rate 404 and the second resistance rate 406 (twenty degrees (20°)). The first activation zone 412 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to actuate the rear wheel brake calipers 126 of the PEPB system 100 of FIGS. 1 and 2 and/or the vehicle 200 of FIG. 2 when the speed of the vehicle 200 does not satisfy (e.g., does not exceed) a speed threshold.

The second activation zone 414 of FIG. 4 extends from the point of transition between the first resistance rate 404 and the second resistance rate 406 (twenty degrees (20°)) to the maximum angular displacement of the parking brake lever 114 in the first direction (sixty degrees (60°)) away from the neutral position 314. When the vehicle 200 of FIG. 2 is in a non-performance mode, the second activation zone 414 corresponds to a state of the PEPB system 100 in which the PEPB controller 140 of FIGS. 1 and 2 provides one or more control signal(s) to the HCU 106 of FIGS. 1 and 2 to cause the HCU 106 to actuate the front wheel brake calipers 122 and the rear wheel brake calipers 126 of the PEPB system 100 of FIGS. 1 and 2 and/or the vehicle 200 of FIG. 2 when the speed of the vehicle 200 satisfies (e.g., exceeds) a speed threshold. When the vehicle 200 of FIG. 2 is in a performance mode, the second activation zone 414 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically actuate the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The first release zone 416 of FIG. 4 extends from the maximum angular displacement of the parking brake lever 114 in the first direction (sixty degrees (60°)) away from the neutral position 314 to the point of transition between the first resistance rate 404 and the second resistance rate 406 (twenty degrees (20°)). When the vehicle 200 of FIG. 2 is in a performance mode, the first release zone 416 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically release the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The second release zone 418 of FIG. 4 extends from the release position threshold 318 (negative five degrees (−5°)) to the maximum angular displacement of the parking brake lever 114 in the second direction (negative ten degrees (−10°)) away from the neutral position 314. The second release zone 418 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2.

In some examples, one or more of the first, second and/or third rate(s) of resistance 404, 406, 408 of FIG. 4 may be a variable rate of resistance that increases as the parking brake lever 114 is moved further away from the neutral position 314. Respective ones of the first, second and third rates of resistance 404, 406, 408 of FIG. 4 may be implemented via one or more springs (e.g., a variable rate spring, a dual rate spring, etc.) and/or resilient structures coupled (either directly or indirectly) to the parking brake lever 114. The implementation of different rates of resistance associated with different ranges of movement of the parking brake lever 114 (e.g., as shown in FIG. 4) enables the parking brake lever 114 to provide a user (e.g., a driver) applying a force (e.g., pushing or pulling) to the free end 202 of the parking brake lever 114 with tactile and/or haptic feedback and/or control information corresponding to the specific position of the parking brake lever 114 relative to the available range of motion of the parking brake lever 114, and/or corresponding to engagement of the PEPB system 100.

Figure 5:
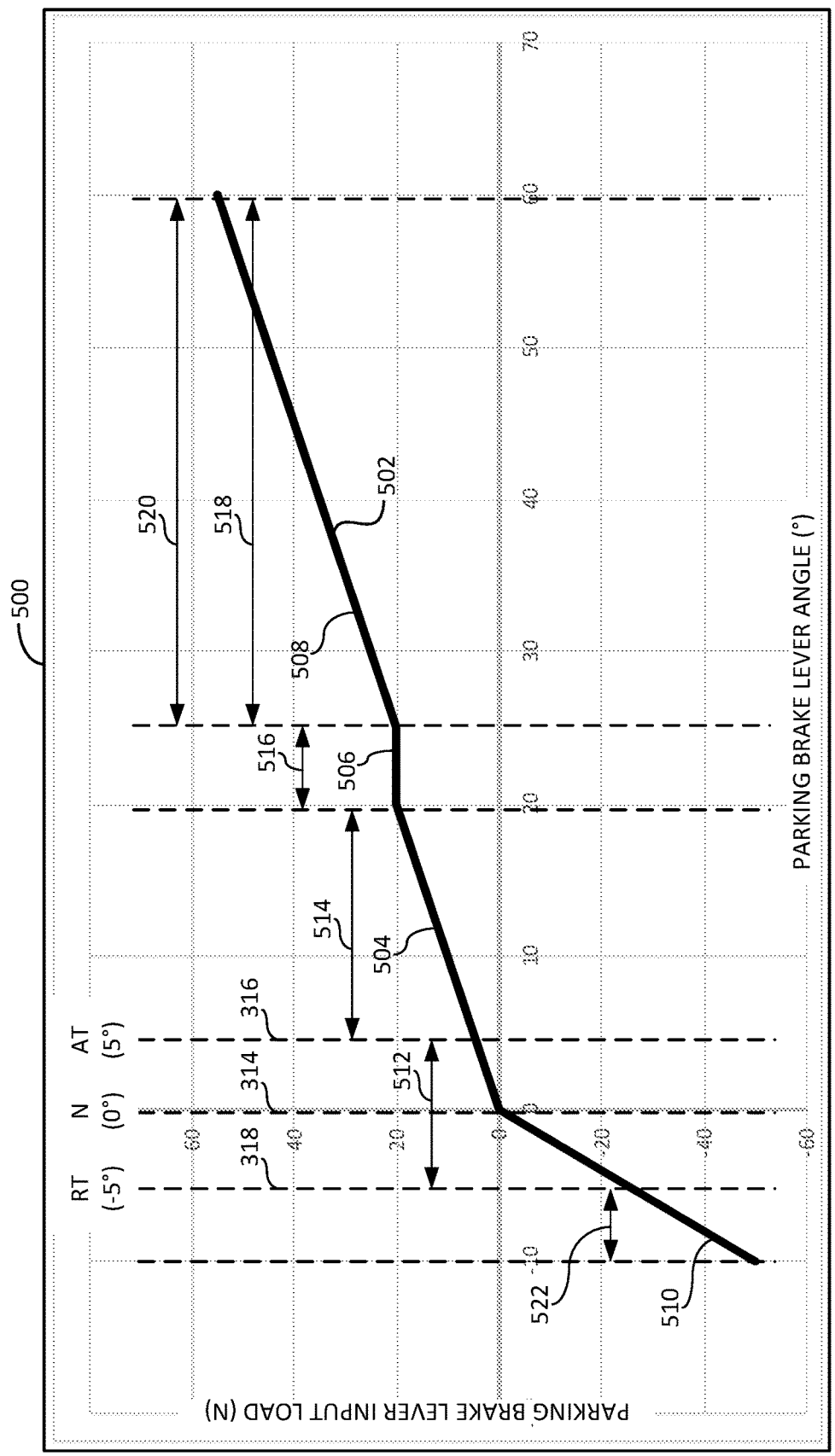
FIG. 5 is an example graph illustrating a second example plot of input load versus angle of the example parking brake lever of FIGS. 1-3.

FIG. 5 is an example graph 500 illustrating a second example plot 502 of input load versus angle of the example parking brake lever 114 of FIGS. 1-3. Different slopes of the plot 502 of FIG. 5 are indicative of different rates of resistance associated with (e.g., encountered, experienced and/or felt by a driver of the vehicle when) moving the parking brake lever 114 at and/or to a specific angular position. The graph 500 of FIG. 5 includes lines corresponding to the neutral position 314, the activation position threshold 316 and the release position threshold 318 of the parking brake lever 114.

In the illustrated example of FIG. 5, a first example rate of resistance 504, a second example rate of resistance 506 and/or a third example rate of resistance 508 is/are associated with (e.g., encountered, experienced and/or felt by a driver of the vehicle when) moving the parking brake lever 114 in a first direction away from the neutral position 314. The first rate of resistance 504 is associated with (e.g., encountered, experienced and/or felt by a driver of the vehicle when) moving the parking brake lever 114 from the neutral position 314 (zero degrees (0°)) to an angular position of approximately twenty degrees (20°). The second rate of resistance 506 is associated with (e.g., encountered, experienced and/or felt by a driver of the vehicle when) moving the parking brake lever 114 from an angular position of approximately twenty degrees (20°) to an angular position of approximately twenty five degrees (25°). In the illustrated example of FIG. 5, the second rate of resistance 506 corresponds to a mechanical detent encountered and/or contacted by the parking brake lever 114. The third rate of resistance 508 is associated with (e.g., encountered, experienced and/or felt by a driver of the vehicle when) moving the parking brake lever 114 from an angular position of approximately twenty five degrees (25°) to an angular position of approximately sixty degrees (60°). A fourth example rate of resistance 510 different from the first rate of resistance 504 is associated with (e.g., encountered, experienced and/or felt by a driver of the vehicle when) moving the parking brake lever 114 in a second direction away from the neutral position 314 opposite the first direction. The fourth rate of resistance 510 is associated with (e.g., encountered, experienced and/or felt by a driver of the vehicle when) moving the parking brake lever 114 from the neutral position 314 (zero degrees (0°)) to an angular position of approximately negative ten degrees (−10°).

In the illustrated example of FIG. 5, the first rate of resistance 504 is greater than the second rate of resistance 506, approximately equal to the third rate of resistance 508, and less than the fourth rate of resistance 510. The second rate of resistance 506 is less than the first rate of resistance 504, less than the third rate of resistance 508, and less than the fourth rate of resistance 510. The third rate of resistance 508 is approximately equal to the first rate of resistance 504, greater than the second rate of resistance 506, and less than the fourth rate of resistance 510. The fourth rate of resistance 510 is greater than the first rate of resistance 504, greater than the second rate of resistance 506, and greater than the third rate of resistance 508.

In the illustrated example of FIG. 5, respective ones of the first, second, third and fourth resistance rates 504, 506, 508, 510 correspond to (e.g., are correlated with) one or more state(s) and/or function(s) of the PEPB system 100. Accordingly, the first, second, third and fourth resistance rates 504, 506, 508, 510 provide a user (e.g., a driver) applying a force (e.g., pushing or pulling) to the free end 202 of the parking brake lever 114 with tactile and/or haptic feedback and/or control information corresponding to a specific state and/or function of the PEPB system 100.

For example, the plot 502 of FIG. 5 includes a first example idle zone 512, a first example activation zone 514, a second example idle zone 516, a second example activation zone 518, a first example release zone 520, and a second example release zone 522. The first idle zone 512 of FIG. 5 extends from the release position threshold 318 (negative five degrees (−5°)) to the activation position threshold 316 (five degrees (5°)). The first idle zone 512 corresponds to an idle state and/or a lack of change in the control function(s) of the PEPB system 100.

The first activation zone 514 of FIG. 5 extends from the activation position threshold 316 (five degrees (5°)) to a point of transition between the first resistance rate 504 and the second resistance rate 506 (twenty degrees (20°)). The first activation zone 514 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to actuate the rear wheel brake calipers 126 of the PEPB system 100 of FIGS. 1 and 2 and/or the vehicle 200 of FIG. 2 when the speed of the vehicle 200 does not satisfy (e.g., does not exceed) a speed threshold.

The second idle zone 516 of FIG. 5 extends from the point of transition between the first resistance rate 504 and the second resistance rate 506 (twenty degrees (20°)) to the point of transition between the second resistance rate 506 and the third resistance rate 508 (twenty-five degrees (25°)). The second idle zone 516 corresponds to an idle state and/or a lack of change in the control function(s) of the PEPB system 100.

The second activation zone 518 of FIG. 5 extends from the point of transition between the second resistance rate 506 and the third resistance rate 508 (twenty-five degrees (25°)) to the maximum angular displacement of the parking brake lever 114 in the first direction (sixty degrees (60°)) away from the neutral position 314. When the vehicle 200 of FIG. 2 is in a non-performance mode, the second activation zone 518 corresponds to a state of the PEPB system 100 in which the PEPB controller 140 of FIGS. 1 and 2 provides one or more control signal(s) to the HCU 106 of FIGS. 1 and 2 to cause the HCU 106 to actuate the front wheel brake calipers 122 and the rear wheel brake calipers 126 of the PEPB system 100 of FIGS. 1 and 2 and/or the vehicle 200 of FIG. 2 when the speed of the vehicle 200 satisfies (e.g., exceeds) a speed threshold. When the vehicle 200 of FIG. 2 is in a performance mode, the second activation zone 518 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically actuate the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The first release zone 520 of FIG. 5 extends from the maximum angular displacement of the parking brake lever 114 in the first direction (sixty degrees (60°)) away from the neutral position 314 to the point of transition between the second resistance rate 506 and the third resistance rate 508 (twenty-five degrees (25°)). When the vehicle 200 of FIG. 2 is in a performance mode, the first release zone 520 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically release the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The second release zone 522 of FIG. 5 extends from the release position threshold 318 (negative five degrees (−5°)) to the maximum angular displacement of the parking brake lever 114 in the second direction (negative ten degrees (−10°)) away from the neutral position 314. The second release zone 522 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2.

In some examples, one or more of the first, second, third and/or fourth rate(s) of resistance 504, 506, 508, 510 of FIG. 5 may be a variable rate of resistance that increases as the parking brake lever 114 is moved further away from the neutral position 314. Respective ones of the first, second, third and fourth rates of resistance 504, 506, 508, 510 of FIG. 5 may be implemented via one or more springs (e.g., a variable rate spring, a dual rate spring, etc.) and/or resilient structures coupled (either directly or indirectly) to the parking brake lever 114. The implementation of different rates of resistance associated with different ranges of movement of the parking brake lever 114 (e.g., as shown in FIG. 5) enables the parking brake lever 114 to provide a user (e.g., a driver) applying a force (e.g., pushing or pulling) to the free end 202 of the parking brake lever 114 with tactile and/or haptic feedback and/or control information corresponding to the specific position of the parking brake lever 114 relative to the available range of motion of the parking brake lever 114, and/or corresponding to engagement of the PEPB system 100.

Figure 6:
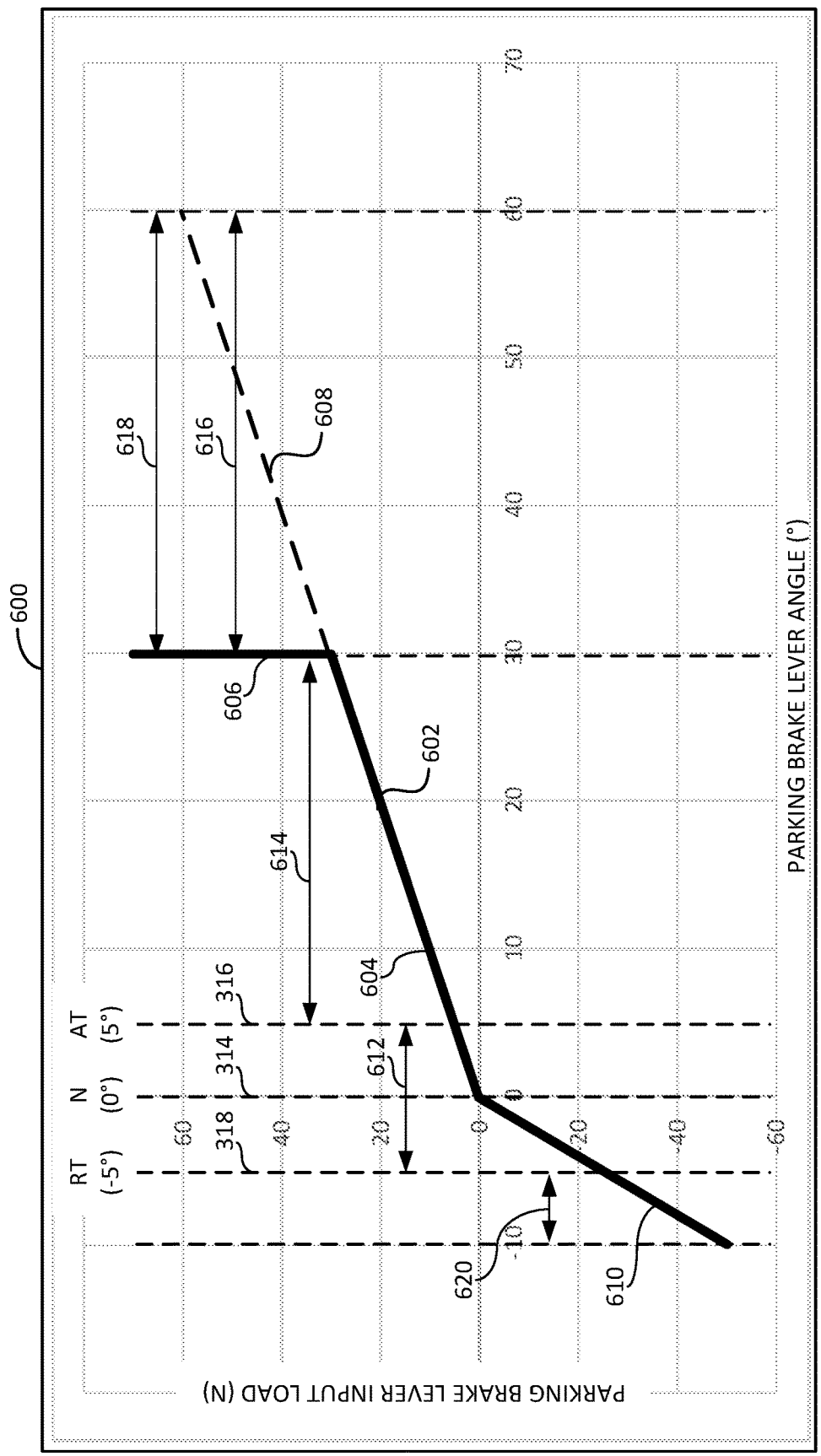
FIG. 6 is an example graph illustrating a third example plot of input load versus angle of the example parking brake lever of FIGS. 1-3.

FIG. 6 is an example graph 600 illustrating a third example plot 602 of input load versus angle of the example parking brake lever 114 of FIGS. 1-3. Different slopes of the plot 602 of FIG. 6 are indicative of different rates of resistance associated with (e.g., encountered, experienced and/or felt by a driver of the vehicle when) moving the parking brake lever 114 at and/or to a specific angular position. The graph 600 of FIG. 6 includes lines corresponding to the neutral position 314, the activation position threshold 316 and the release position threshold 318 of the parking brake lever 114.

In the illustrated example of FIG. 6, a first example rate of resistance 604, a second example rate of resistance 606 and/or a third example rate of resistance 608 is/are associated with (e.g., encountered, experienced and/or felt by a driver of the vehicle when) moving the parking brake lever 114 in a first direction away from the neutral position 314. The first rate of resistance 604 is associated with (e.g., encountered, experienced and/or felt by a driver of the vehicle when) moving the parking brake lever 114 from the neutral position 314 (zero degrees (0°)) to an angular position of approximately thirty degrees (30°). The second rate of resistance 606 is associated with (e.g., encountered, experienced and/or felt by a driver of the vehicle when) attempting to move the parking brake lever 114 beyond an angular position of approximately thirty degrees (30°) when an actuatable mechanical lock (e.g., a trigger lock) of the parking brake lever 114 has not been actuated. The third rate of resistance 608 is associated with (e.g., encountered, experienced and/or felt by a driver of the vehicle when) moving the parking brake lever 114 from an angular position of approximately thirty degrees (30°) to an angular position of approximately sixty degrees (60°) when the actuatable mechanical lock of the parking brake lever 114 has been actuated. A fourth example rate of resistance 610 different from the first rate of resistance 604 is associated with (e.g., encountered, experienced and/or felt by a driver of the vehicle when) moving the parking brake lever 114 in a second direction away from the neutral position 314 opposite the first direction. The fourth rate of resistance 610 is associated with (e.g., encountered, experienced and/or felt by a driver of the vehicle when) moving the parking brake lever 114 from the neutral position 314 (zero degrees (0°)) to an angular position of approximately negative ten degrees (−10°).

In the illustrated example of FIG. 6, the first rate of resistance 604 is less than the second rate of resistance 606, approximately equal to the third rate of resistance 608, and less than the fourth rate of resistance 610. The second rate of resistance 606 is greater than the first rate of resistance 604, greater than the third rate of resistance 608, and greater than the fourth rate of resistance 610. The third rate of resistance 608 is approximately equal to the first rate of resistance 604, less than the second rate of resistance 606, and less than the fourth rate of resistance 610. The fourth rate of resistance 610 is greater than the first rate of resistance 604, less than the second rate of resistance 606, and greater than the third rate of resistance 608.

In the illustrated example of FIG. 6, respective ones of the first, second, third and fourth resistance rates 604, 606, 608, 610 correspond to (e.g., are correlated with) one or more state(s) and/or function(s) of the PEPB system 100. Accordingly, the first, second, third and fourth resistance rates 604, 606, 608, 610 provide a user (e.g., a driver) applying a force (e.g., pushing or pulling) to the free end 202 of the parking brake lever 114 with tactile and/or haptic feedback and/or control information corresponding to a specific state and/or function of the PEPB system 100.

For example, the plot 602 of FIG. 6 includes an example idle zone 612, a first example activation zone 614, a second example activation zone 616, a first example release zone 618, and a second example release zone 620. The idle zone 612 of FIG. 6 extends from the release position threshold 318 (negative five degrees (−5°)) to the activation position threshold 316 (five degrees (5°)). The idle zone 612 corresponds to an idle state and/or a lack of change in the control function(s) of the PEPB system 100.

The first activation zone 614 of FIG. 6 extends from the activation position threshold 316 (five degrees (5°)) to a point of transition between the first resistance rate 604 and the second resistance rate 606 (thirty degrees (30°)). The first activation zone 614 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to actuate the rear wheel brake calipers 126 of the PEPB system 100 of FIGS. 1 and 2 and/or the vehicle 200 of FIG. 2 when the speed of the vehicle 200 does not satisfy (e.g., does not exceed) a speed threshold. The first activation zone 614 may additionally and/or alternatively correspond to a state of the PEPB system 100 in which the PEPB controller 140 of FIGS. 1 and 2 provides one or more control signal(s) to the HCU 106 of FIGS. 1 and 2 to cause the HCU 106 to actuate the front wheel brake calipers 122 and the rear wheel brake calipers 126 of the PEPB system 100 of FIGS. 1 and 2 and/or the vehicle 200 of FIG. 2 when the speed of the vehicle 200 satisfies (e.g., exceeds) a speed threshold.

The second activation zone 616 of FIG. 6 extends from the point of transition between the first resistance rate 604 and the second resistance rate 606 (thirty degrees (30°)) to the maximum angular displacement of the parking brake lever 114 in the first direction (sixty degrees (60°)) away from the neutral position 314. The second activation zone 616 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically actuate the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The first release zone 618 of FIG. 6 extends from the maximum angular displacement of the parking brake lever 114 in the first direction (sixty degrees (60°)) away from the neutral position 314 to the point of transition between the second resistance rate 606 and the third resistance rate 608 (thirty degrees (30°)). When the vehicle 200 of FIG. 2 is in a performance mode, the first release zone 618 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically release the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The second release zone 620 of FIG. 6 extends from the release position threshold 318 (negative five degrees (−5°)) to the maximum angular displacement of the parking brake lever 114 in the second direction (negative ten degrees (−10°)) away from the neutral position 314. The second release zone 620 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2.

In some examples, one or more of the first, second, third and/or fourth rate(s) of resistance 604, 606, 608, 610 of FIG. 6 may be a variable rate of resistance that increases as the parking brake lever 114 is moved further away from the neutral position 314. Respective ones of the first, second, third and fourth rates of resistance 604, 606, 608, 610 of FIG. 6 may be implemented via one or more springs (e.g., a variable rate spring, a dual rate spring, etc.) and/or resilient structures coupled (either directly or indirectly) to the parking brake lever 114. The implementation of different rates of resistance associated with different ranges of movement of the parking brake lever 114 (e.g., as shown in FIG. 5) enables the parking brake lever 114 to provide a user (e.g., a driver) applying a force (e.g., pushing or pulling) to the free end 202 of the parking brake lever 114 with tactile and/or haptic feedback and/or control information corresponding to the specific position of the parking brake lever 114 relative to the available range of motion of the parking brake lever 114, and/or corresponding to engagement of the PEPB system 100.

Figure 7:
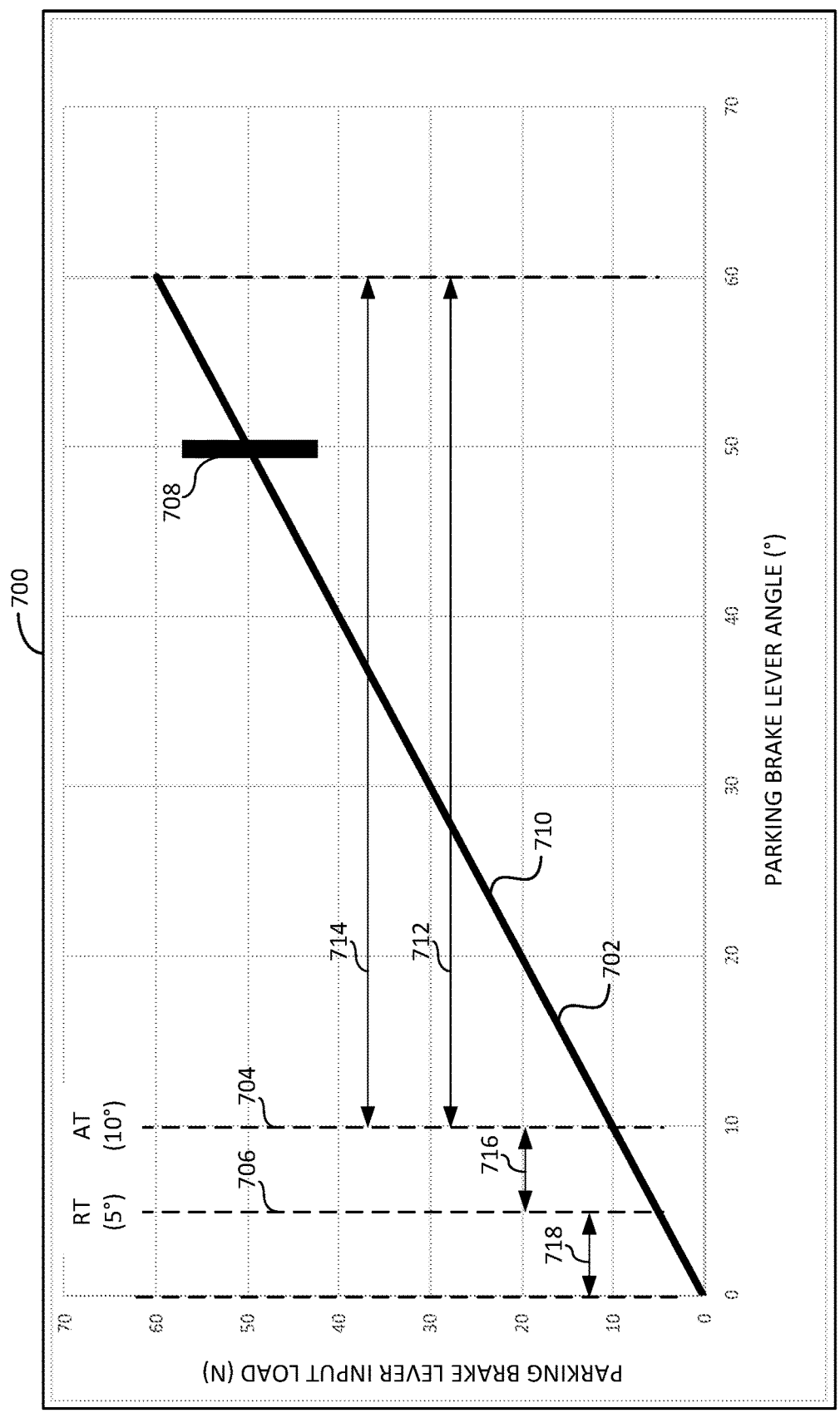
FIG. 7 is an example graph illustrating a fourth example plot of input load versus angle of the example parking brake lever of FIGS. 1-3.

FIG. 7 is an example graph 700 illustrating a fourth example plot 702 of input load versus angle of the parking brake lever 114 of FIGS. 1-3. The slope of the plot 702 of FIG. 7 is indicative of a rate of resistance associated with (e.g., encountered, experienced and/or felt by a driver of the vehicle when) moving the parking brake lever 114 at and/or to a specific angular position. The graph 700 of FIG. 7 includes lines corresponding to an activation position threshold 704 (ten degrees (10°)) and a release position threshold 706 (five degrees (5°)) of the parking brake lever 114.

In connection with the example of FIG. 7, the parking brake lever 114 includes a ratchet locking mechanism that locks the parking brake lever 114 at one or more angular position intervals (e.g., twenty degrees (20°), thirty degrees (30°), forty degrees (40°) etc.). In the illustrated example of FIG. 7, the ratchet locking mechanism locks the parking brake lever 114 at an example angular position 708 of fifty degrees (50°). The ratchet locking mechanism includes an actuatable trigger that, when actuated, disengages and/or releases the ratchet locking mechanism and/or the parking brake lever 114 from the locked angular position. In the illustrated example of FIG. 7, a first example rate of resistance 710 is associated with (e.g., encountered, experienced and/or felt by a driver of the vehicle when) moving the parking brake lever 114 in a first direction and/or moving the parking brake lever 114 in a second direction opposite the first direction. The first rate of resistance 710 is associated with (e.g., encountered, experienced and/or felt by a driver of the vehicle when) moving the parking brake lever 114 from an angular position of approximately zero degrees (0°) to an angular position of approximately sixty degrees (60°). The first rate of resistance 710 is also associated with moving the parking brake lever 114 from an angular position of approximately sixty degrees (60°) to an angular position of approximately zero degrees (0°) when the ratchet locking mechanism of the parking brake lever 114 is disengaged and/or released via the actuatable trigger.

In the illustrated example of FIG. 7, the first rate of resistance 710 corresponds to (e.g., is correlated with) one or more state(s) and/or function(s) of the PEPB system 100. Accordingly, the first rate of resistance 710 provides a user (e.g., a driver) applying a force (e.g., pushing or pulling) to the free end 202 of the parking brake lever 114 with tactile and/or haptic feedback and/or control information corresponding to a specific state and/or function of the PEPB system 100.

For example, the plot 702 of FIG. 7 includes an example activation zone 712, a first example release zone 714, an example hysteresis zone 716, and a second example release zone 718. The activation zone 712 of FIG. 7 extends from the activation position threshold 704 (ten degrees (10°)) to the maximum angular displacement of the parking brake lever 114 in the first direction (sixty degrees (60°)). The activation zone 712 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to actuate the rear wheel brake calipers 126 of the PEPB system 100 of FIGS. 1 and 2 and/or the vehicle 200 of FIG. 2 when the speed of the vehicle 200 does not satisfy (e.g., does not exceed) a speed threshold. The activation zone 712 may additionally and/or alternatively correspond to a state of the PEPB system 100 in which the PEPB controller 140 of FIGS. 1 and 2 provides one or more control signal(s) to the HCU 106 of FIGS. 1 and 2 to cause the HCU 106 to actuate the front wheel brake calipers 122 and the rear wheel brake calipers 126 of the PEPB system 100 of FIGS. 1 and 2 and/or the vehicle 200 of FIG. 2 when the speed of the vehicle 200 satisfies (e.g., exceeds) a speed threshold. The activation zone 712 may additionally and/or alternatively correspond to a state of the PEPB system 100 in which the PEPB controller 140 of FIGS. 1 and 2 provides one or more control signal(s) to the HCU 106 of FIGS. 1 and 2 to cause the HCU 106 to dynamically actuate the rear wheel brake calipers 126 of the PEPB system 100) of FIGS. 1 and 2 and/or the vehicle 200 of FIG. 2 based on the position of the parking brake lever 114 when the speed of the vehicle 200 satisfies (e.g., exceeds) a speed threshold.

The first release zone 714 of FIG. 7 extends from the maximum angular displacement of the parking brake lever 114 in the first direction (sixty degrees (60°)) to the activation position threshold 704 (ten degrees (10°)). When the vehicle 200 of FIG. 2 is in a performance mode, the first release zone 714 corresponds to a state of the PEPB system 100 in which the PEPB controller 140 of FIGS. 1 and 2 provides one or more control signal(s) to the HCU 106 of FIGS. 1 and 2 to cause the HCU 106 to dynamically release the rear wheel brake calipers 126 of the PEPB system 100 of FIGS. 1 and 2 and/or the vehicle 200 of FIG. 2 based on the position of the parking brake lever 114 when the speed of the vehicle 200 satisfies (e.g., exceeds) a speed threshold.

The hysteresis zone 716 of FIG. 7 extends from the activation position threshold 704 (ten degrees (10°)) to the release position threshold 706 (five degrees (5°)). The hysteresis zone 716 corresponds to a hysteresis band separating the activation position threshold 704 and the release position threshold 706.

The second release zone 718 of FIG. 7 extends from the release position threshold 706 (five degrees (5°)) to the maximum angular displacement of the parking brake lever 114 in the second direction (zero degrees (0°)). The second release zone 718 corresponds to a state of the PEPB system 100 in which the PEPB controller 140 of FIGS. 1 and 2 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2.

In some examples, the first rate of resistance 710 of FIG. 7 may be a variable rate of resistance that increases as the parking brake lever 114 is moved in the first direction. The first rate of resistance 710 of FIG. 7 may be implemented via one or more springs (e.g., a variable rate spring, a dual rate spring, etc.) and/or resilient structures coupled (either directly or indirectly) to the parking brake lever 114. The implementation of a rate of resistance associated with a range of movement of the parking brake lever 114 (e.g., as shown in FIG. 7) enables the parking brake lever 114 to provide a user (e.g., a driver) applying a force (e.g., pushing or pulling) to the free end 202 of the parking brake lever 114 with tactile and/or haptic feedback and/or control information corresponding to the specific position of the parking brake lever 114 relative to the available range of motion of the parking brake lever 114, and/or corresponding to engagement of the PEPB system 100.

Returning to the examples of FIGS. 1 and 2, the example PEPB control module 116 includes an example PEPB controller 140 and an example PEPB memory 142. The PEPB controller 140 of FIGS. 1 and 2 may be implemented by a semiconductor device such as a microprocessor, controller or microcontroller. The PEPB controller 140, and/or, more generally, the PEPB control module 116 manages and/or controls the operation of the HCU 106 and the rear wheel brake caliper electric motors 128 of the PEPB system 100 based on data and/or information received, obtained and/or accessed by the PEPB controller 140 and/or the PEPB control module 116 from one or more of the speed sensor 110, the driving mode sensor 112, the user interface 118 and/or the position sensor 138.

The PEPB controller 140 of FIGS. 1 and 2 determines and/or identifies a speed of a vehicle (e.g., the vehicle 200 of FIG. 2) based on data and/or information sensed, measured and/or detected by the speed sensor 110. For example, the PEPB controller 140 may determine that the speed of the vehicle 200 is thirty miles per hour (30 mph) based on data and/or information sensed, measured and/or detected by the speed sensor 110. The PEPB controller 140 compares the determined and/or identified vehicle speed to a speed threshold to determine whether the vehicle speed satisfies (e.g., exceeds) the speed threshold. For example, the PEPB controller 140 may determine that the example vehicle speed of thirty miles per hour (30 mph) described above satisfies an example speed threshold of one mile per hour (1 mph) and above. The speed threshold may be stored in a computer-readable storage medium storing electronically readable data accessible to the PEPB controller 140 such as the PEPB memory 142 described below.

The PEPB controller 140 of FIGS. 1 and 2 determines and/or identifies a driving mode of a vehicle (e.g., the vehicle 200 of FIG. 2) based on data and/or information sensed, measured and/or detected by the driving mode sensor 112. For example, the PEPB controller 140 may determine that the driving mode of the vehicle 200 is a sport mode based on data and/or information sensed, measured and/or detected by the driving mode sensor 112. The PEPB controller 140 determines whether the determined and/or identified vehicle driving mode is a performance mode. For example, the PEPB controller 140 may recognize the determined and/or identified driving mode (e.g., the sport mode) as associated with and/or indicative of a performance driving mode based on a driving mode correlation table, list and/or matrix. The driving mode correlation table, list and/or matrix utilized by the PEPB controller 140 may be of any format and may include any number of factors and/or fields. The driving mode correlation table, list and/or matrix may be stored in a computer-readable storage medium storing electronically readable data accessible to the PEPB controller 140 such as the PEPB memory 142 described below.

Figure 8:
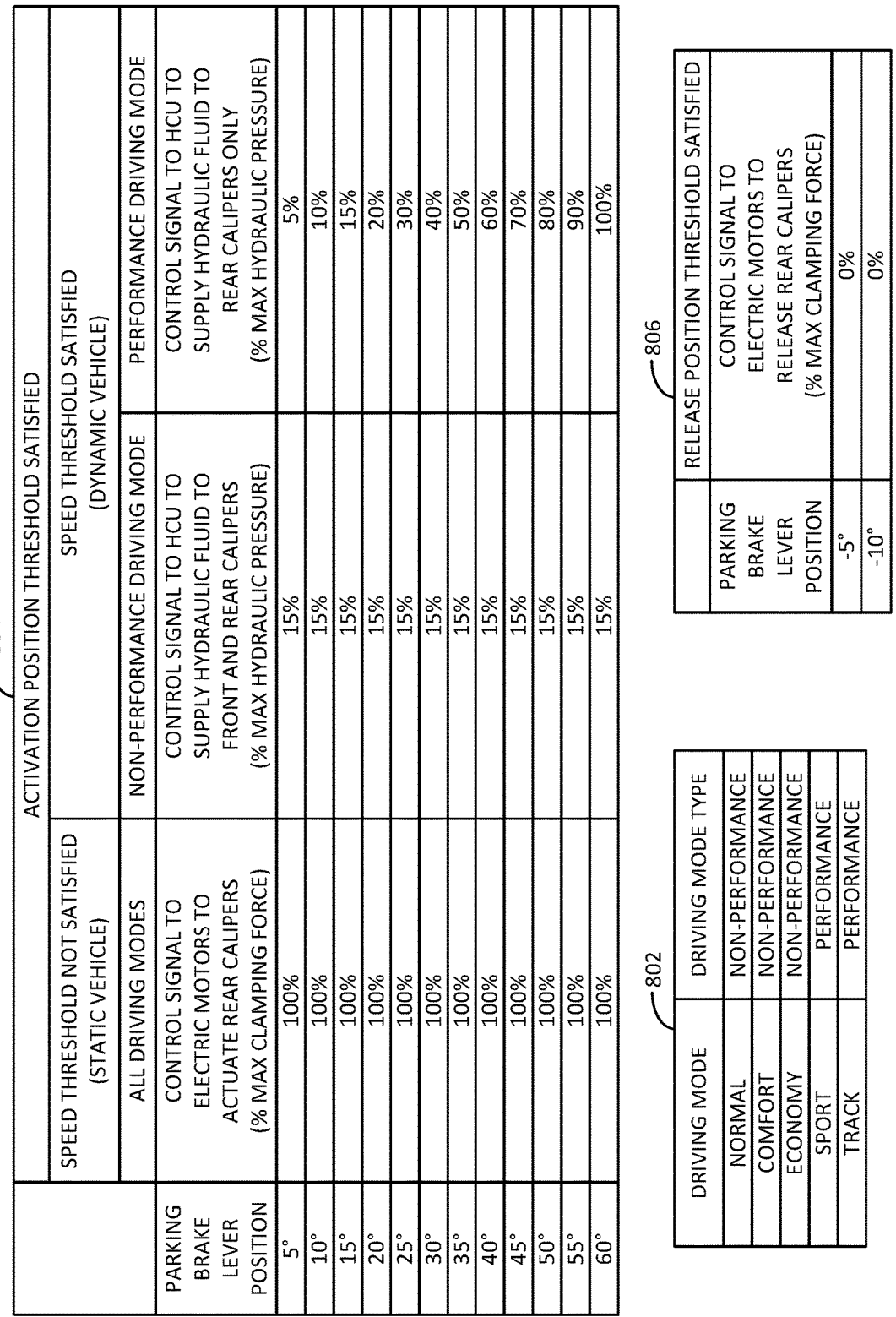
FIG. 8 illustrates an example driving mode correlation table, an example activation position correlation table, and an example release position correlation table utilized by the example PEPB controller of FIGS. 1 and 2.

FIG. 8 illustrates an example driving mode correlation table 802 utilized by the example PEPB controller 140 of FIGS. 1 and 2. In the illustrated example of FIG. 8, the driving mode correlation table 802 associates and/or identifies respective ones of vehicle driving modes (e.g., a normal mode, a comfort mode, an economy mode, a sport mode, and a track mode) as being either a performance mode or a non-performance mode. For example, the driving mode correlation table 802 associates and/or identifies the normal, comfort and/or economy modes as non-performance modes, and associates and/or identifies the sport and/or track modes as performance modes. In this example, if the PEPB controller 140 determines and/or identifies that the driving mode of the vehicle 200 is the sport mode, the PEPB controller 140 accordingly determines, based on the driving mode correlation table 802, that the driving mode of the vehicle 200 is a performance mode.

Returning to the examples of FIGS. 1 and 2, the PEPB controller 140 of FIGS. 1 and 2 determines and/or identifies a position of the parking brake lever 114 of a vehicle (e.g., the vehicle 200 of FIG. 2) based on data and/or information sensed, measured and/or detected by the position sensor 138. For example, the PEPB controller 140 may determine based on data and/or information sensed, measured and/or detected by the position sensor 138 that the parking brake lever 114 is in a position corresponding to the second example position 304 (e.g., thirty degrees (30°)) illustrated in FIG. 3. The PEPB controller 140 compares the determined and/or identified parking brake lever position to an activation position threshold to determine whether the parking brake lever position satisfies (e.g., exceeds) the activation position threshold. For example, the PEPB controller 140 may determine that the second example position 304 (e.g., thirty degrees (30°)) of the parking brake lever 114 satisfies the activation position threshold 316 (e.g., five degrees (5°) or greater) illustrated in FIG. 3. The activation position threshold may be stored in a computer-readable storage medium storing electronically readable data accessible to the PEPB controller 140 such as the PEPB memory 142 described below.

As another example, the PEPB controller 140 may determine based on data and/or information sensed, measured and/or detected by the position sensor 138 that the parking brake lever 114 is in a position corresponding to the fourth example position 308 (e.g., negative ten degrees (−10)) illustrated in FIG. 3. The PEPB controller 140 compares the determined and/or identified parking brake lever position to a release position threshold to determine whether the parking brake lever position satisfies (e.g., is less than) the release position threshold. For example, the PEPB controller 140 may determine that the fourth example position 308 (e.g., negative ten degrees (−10°)) of the parking brake lever 114 satisfies the release position threshold 318 (e.g., negative five degrees (−5°) or less) illustrated in FIG. 3. The release position threshold may be stored in a computer-readable storage medium storing electronically readable data accessible to the PEPB controller 140 such as the PEPB memory 142 described below.

Based on the determinations as to whether the vehicle speed satisfies the speed threshold, whether the vehicle driving mode is a performance mode, whether the parking brake lever position satisfies the activation position threshold, and/or whether the parking brake lever position satisfies the release position threshold, the PEPB controller 140 of FIGS. 1 and 2 determines one or more braking control signal(s) to be provided to the HCU 106 and/or the rear wheel brake caliper electric motors 128 of FIGS. 1 and 2.

For example, the PEPB controller 140 of FIGS. 1 and 2 may associate the determinations made by the PEPB controller 140 as to whether the vehicle speed satisfies the speed threshold, whether the vehicle driving mode is a performance mode, and whether the parking brake lever position satisfies the activation position threshold with a braking control signal to be provided to the HCU 106 and/or the rear wheel brake caliper electric motors 128 based on an activation position correlation table, list and/or matrix. The activation position correlation table, list and/or matrix utilized by the PEPB controller 140 may be of any format and may include any number of factors and/or fields. The activation position correlation table, list and/or matrix may be stored in a computer-readable storage medium storing electronically readable data accessible to the PEPB controller 140 such as the PEPB memory 142 described below.

FIG. 8 illustrates an example activation position correlation table 804 utilized by the example PEPB controller 140 of FIGS. 1 and 2. In the illustrated example of FIG. 8, the activation position correlation table 804 associates and/or identifies respective activation positions of the parking brake lever 114 satisfying the activation position threshold with braking control signals to be provided to the HCU 106 and/or the rear wheel brake caliper electric motors 128 based on whether the vehicle speed satisfies the speed threshold and based on whether the vehicle driving mode is a performance mode.

For example, the PEPB controller 140 may determine that the position of the parking brake lever 114 corresponds to the second example position 304 (e.g., thirty degrees (30°)) of FIG. 3, that the vehicle speed is zero miles per hour (0 mph), which fails to satisfy a one mile per hour (1 mph) speed threshold), and that the vehicle driving mode is a performance mode (e.g., a sport mode). The activation position correlation table 804 of FIG. 8 associates and/or identifies such determinations with a brake control signal to be provided to the rear wheel brake caliper electric motors 128 corresponding to an application of one hundred percent (100%) of a maximum clamping force to the rear wheel brake calipers 126. In this example, the PEPB controller 140, based on the activation position correlation table 804, provides a braking control signal to the rear wheel brake caliper electric motors 128 to cause the rear wheel brake caliper electric motors 128 to apply one hundred percent (100%) of the maximum clamping force to the rear wheel brake calipers 126. In scenarios where the vehicle speed fails to satisfy the speed threshold and the parking brake lever position satisfies the activation position threshold, the activation position correlation table 804 of FIG. 8 provides for the same percentage (e.g., one hundred percent (100%)) of the maximum clamping force to be applied to the rear wheel brake calipers 126 via the rear wheel brake caliper electric motors 128 regardless of the specific activation position of the parking brake lever 114.

As another example, the PEPB controller 140 may determine that the position of the parking brake lever 114 corresponds to the second example position 304 (e.g., thirty degrees (30°)) of FIG. 3, that the vehicle speed is thirty miles per hour (30 mph), which satisfies a one mile per hour (1 mph) speed threshold), and that the vehicle driving mode is a non-performance mode (e.g., a normal mode). The activation position correlation table 804 of FIG. 8 associates and/or identifies such determinations with a brake control signal to be provided to the HCU 106 corresponding to an application and/or supply of fifteen percent (15%) of a maximum hydraulic pressure to the front wheel brake calipers 122 and the rear wheel brake calipers 126. In this example, the PEPB controller 140, based on the activation position correlation table 804, provides a braking control signal to the HCU 106 to cause the HCU 106 to apply and/or supply fifteen percent (15%) of a maximum hydraulic pressure to the front wheel brake calipers 122 and the rear wheel brake calipers 126. In scenarios where the vehicle speed satisfies the speed threshold, the driving mode is a non-performance mode, and the parking brake lever position satisfies the activation position threshold, the activation position correlation table 804 of FIG. 8 provides for the same percentage (e.g., fifteen percent (15%)) of the maximum hydraulic pressure to be applied and/or supplied to the front wheel brake calipers 122 and the rear wheel brake calipers 126 via the HCU 106 regardless of the specific activation position of the parking brake lever 114.

In other examples involving scenarios where the vehicle speed satisfies the speed threshold, the driving mode is a non-performance mode, and the parking brake lever position satisfies the activation position threshold, the activation position correlation table, list and/or matrix may provide for varying percentages of the maximum hydraulic pressure to be applied and/or supplied to the front wheel brake calipers 122 and the rear wheel brake calipers 126 via the HCU 106 based on the specific activation position of the parking brake lever 114. In other examples involving scenarios where the vehicle speed satisfies the speed threshold, the driving mode is a non-performance mode, and the parking brake lever position satisfies the activation position threshold, the activation position correlation table, list and/or matrix may provide for varying percentages of the maximum hydraulic pressure to be applied and/or supplied to the front wheel brake calipers 122 and the rear wheel brake calipers 126 via the HCU 106 based on the specific speed of the vehicle. Thus, the specific data values and/or data trends shown in the example activation position correlation table 804 of FIG. 8 are merely exemplary.

As another example, the PEPB controller 140 may determine that the position of the parking brake lever 114 corresponds to the second example position 304 (e.g., thirty degrees (30°)) of FIG. 3, that the vehicle speed is thirty miles per hour (30 mph), which satisfies a one mile per hour (1 mph) speed threshold), and that the vehicle driving mode is a performance mode (e.g., a sport mode). The activation position correlation table 804 of FIG. 8 associates and/or identifies such determinations with a brake control signal to be provided to the HCU 106 corresponding to an application and/or supply of forty percent (40%) of a maximum hydraulic pressure to the rear wheel brake calipers 126 only. In this example, the PEPB controller 140, based on the activation position correlation table 804, provides a braking control signal to the HCU 106 to cause the HCU 106 to apply and/or supply forty percent (40%) of a maximum hydraulic pressure to the rear wheel brake calipers 126. In scenarios where the vehicle speed satisfies the speed threshold, the driving mode is a performance mode, and the parking brake lever position satisfies the activation position threshold, the activation position correlation table 804 of FIG. 8 provides for varying percentages of the maximum hydraulic pressure to be applied and/or supplied to the rear wheel brake calipers 126 via the HCU 106 based on the specific activation position of the parking brake lever 114. For example, in such scenarios, the activation position correlation table 804 provides for forty percent (40%) of the maximum hydraulic pressure to be applied and/or supplied to the rear wheel brake calipers 126 when the activation position of the parking brake lever is thirty degrees (30°), and provides for one hundred percent (100%) of the maximum hydraulic pressure to be applied and/or supplied to the rear wheel brake calipers 126 when the activation position of the parking brake lever is sixty degrees (60°). Thus, in such scenarios, the hydraulic pressure to be applied and/or supplied to the rear wheel brake calipers 126 is variable based on (e.g., proportional to) the specific activation position of the parking brake lever 114. As mentioned above, the specific data values and/or data trends shown in the example activation position correlation table 804 of FIG. 8 are merely exemplary.

Returning to the examples of FIGS. 1 and 2, the PEPB controller 140 of FIGS. 1 and 2 also associates the determination made by the PEPB controller 140 as to whether the parking brake lever position satisfies the release position threshold with a braking control signal to be provided to the rear wheel brake caliper electric motors 128 based on a release position correlation table, list and/or matrix. The release position correlation table, list and/or matrix utilized by the PEPB controller 140 may be of any format and may include any number of factors and/or fields. The release position correlation table, list and/or matrix may be stored in a computer-readable storage medium storing electronically readable data accessible to the PEPB controller 140 such as the PEPB memory 142 described below.

FIG. 8 illustrates an example release position correlation table 806 utilized by the example PEPB controller 140 of FIGS. 1 and 2. In the illustrated example of FIG. 8, the release position correlation table 806 associates and/or identifies respective release positions of the parking brake lever 114 satisfying the release position threshold with braking control signals to be provided to the rear wheel brake caliper electric motors 128. For example, the PEPB controller 140 may determine that the position of the parking brake lever 114 corresponds to the fourth example position 308 (e.g., negative ten degrees (−10°)) of FIG. 3. The release position correlation table 806 of FIG. 8 associates and/or identifies such a determination with a brake control signal to be provided to the rear wheel brake caliper electric motors 128 corresponding to an application of zero percent (0%) of a maximum clamping force to the rear wheel brake calipers 126. In this example, the PEPB controller 140, based on the release position correlation table 806, provides a braking control signal to the rear wheel brake caliper electric motors 128 to cause the rear wheel brake caliper electric motors 128 to apply zero percent (0%) of the maximum clamping force to the rear wheel brake calipers 126 (e.g., to release the rear wheel brake calipers). In scenarios where the parking brake lever position satisfies the release position threshold, the release position correlation table 806 of FIG. 8 provides for the same percentage (e.g., zero percent (0%)) of the maximum clamping force to be applied to the rear wheel brake calipers 126 via the rear wheel brake caliper electric motors 128 regardless of the specific release position of the parking brake lever 114. The specific data values and/or data trends shown in the example release position correlation table 806 of FIG. 8 are merely exemplary.

Returning to the examples of FIGS. 1 and 2, the PEPB controller 140 of FIGS. 1 and 2 determines whether drive off conditions for the vehicle 200 of FIG. 2 have been detected. For example, the PEPB controller 140 may determine that drive off conditions (e.g., ignition of vehicle 200 turned on, accelerator pedal of vehicle 200 depressed, transmission of vehicle 200 in drive, etc.) have been detected by one or more sensor(s) (not shown) and/or electric control module(s) (not shown) of the vehicle 200 of FIG. 2 in communication with the PEPB controller 140 and/or the PEPB control module 116. In some examples, the PEPB controller 140 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2 in response to determining that drive off conditions for the vehicle 200 have been detected.

The PEPB memory 142 of FIGS. 1 and 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the PEPB memory 142 may be stored in any file and/or data structure format, organization scheme, and/or arrangement.

Data and/or information received by the PEPB controller 140, and/or, more generally, by the PEPB control module 116 from any of the speed sensor 110, the driving mode sensor 112, the user interface 118, and/or the position sensor 138 may be stored in the PEPB memory 142. Data and/or information corresponding to any of the speed threshold, the driving mode correlation table, list and/or matrix, the activation position threshold, the release position threshold, the activation position correlation table, list and/or matrix, and/or the release position correlation table, list and/or matrix may also be stored in the PEPB memory 142. Data and/or information stored in the PEPB memory 142 is accessible to the PEPB controller 140 of FIGS. 1 and 2, and/or, more generally, to the PEPB control module 116 of FIGS. 1 and 2.

The example user interface 118 of FIGS. 1 and 2 facilitates interactions and/or communications between a user (e.g., a driver) of a vehicle (e.g., the vehicle 200 of FIG. 2) and the PEPB controller 140, and/or, more generally, the PEPB control module 116. Data and/or information that is presented and/or received via the user interface 118 may be of any type, form and/or format, and may be stored in a computer-readable storage medium such as the example PEPB memory 142 of the PEPB control module 116 described above.

The user interface 118 of FIGS. 1 and 2 includes one or more input device(s) 144 via which the user may input information and/or data to the PEPB controller 140, and/or more generally, to the PEPB control module 116. For example, the user interface 118 may include a button, a microphone, and/or a touchscreen that enable(s) the user to convey data and/or commands to the PEPB controller 140, and/or, more generally, to the PEPB control module 116. In the illustrated example of FIG. 2, the input device 144 of the user interface 118 is implemented as an example driving mode selection button 204 positioned on an example steering wheel 206 of the vehicle 200.

The user interface 118 of FIGS. 1 and 2 also includes one or more output device(s) 146 via which the PEPB controller 140, and/or, more generally, the PEPB control module 116 presents information and/or data in visual and/or audible form to the user of the vehicle. For example, the user interface 118 may include a light emitting diode, a touchscreen, and/or a liquid crystal display for presenting visual information, and/or a speaker for presenting audible information. In the illustrated example of FIG. 2, the output device 146 of the user interface 118 is implemented as an example instrument panel 208 that is viewable by the user of the vehicle 200. The instrument panel 208 includes information and/or data indicating an example speed 210 of the vehicle 200, an example driving mode 212 of the vehicle 200, and an example degree and/or extent of braking force 214 applied by the PEPB system 100 of the vehicle 200.

While example manners of implementing the example PEPB system 100 are illustrated in FIGS. 1 and 2, one or more of the elements, processes and/or devices illustrated in FIGS. 1 and 2 may be combined, divided, re-arranged, omitted, eliminated and/or implemented in any other way. Further, the example speed sensor 110, the example driving mode sensor 112, the example user interface 118, the example HCU controller 130, the example HCU memory 132, the example position sensor 138, the example PEPB controller 140 and/or the example PEPB memory 142 of FIGS. 1 and 2 may be implemented by hardware, software, firmware and/or any combination of hardware, software and/or firmware. Thus, for example, any of the example speed sensor 110, the example driving mode sensor 112, the example user interface 118, the example HCU controller 130, the example HCU memory 132, the example position sensor 138, the example PEPB controller 140 and/or the example PEPB memory 142 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example speed sensor 110, the example driving mode sensor 112, the example user interface 118, the example HCU controller 130, the example HCU memory 132, the example position sensor 138, the example PEPB controller 140 and/or the example PEPB memory 142 is/are hereby expressly defined to include a tangible computer readable storage device or storage disk such as a memory, a digital versatile disk (DVD), a compact disk (CD), a Blu-ray disk, etc. storing the software and/or firmware. Further still, the example PEPB system 100 of FIGS. 1 and 2 may include one or more elements, processes and/or devices in addition to, or instead of, those illustrated in FIGS. 1 and 2, and/or may include more than one of any or all of the illustrated elements, processes and devices.

Figure 9A:
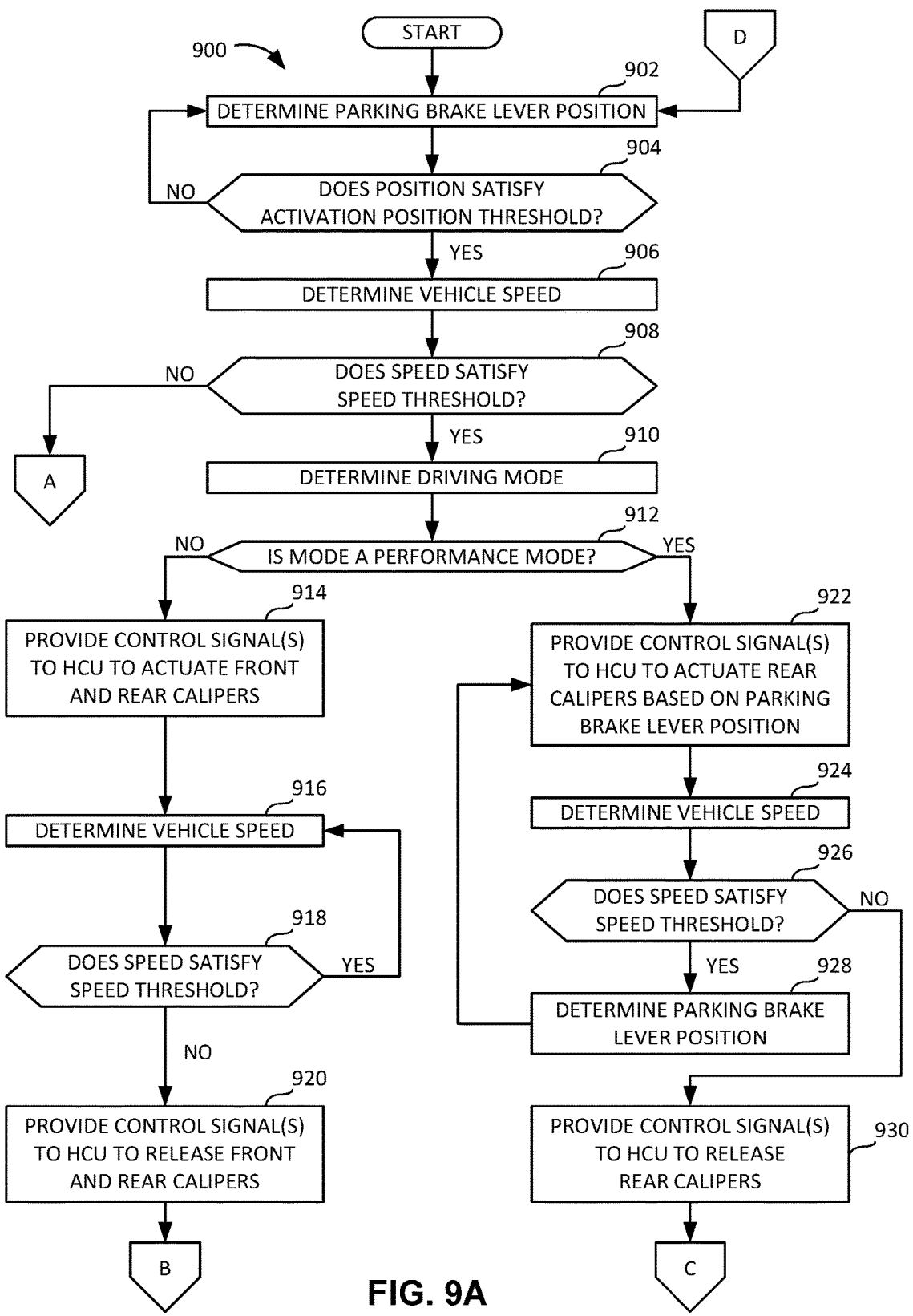
FIGS. 9A and 9B are a flowchart representative of an example method that may be executed at the example PEPB controller of FIGS. 1 and 2 to provide braking control signals to the example PEPB system of FIGS. 1 and 2 and/or the example vehicle of FIG. 2.
Figure 9B:
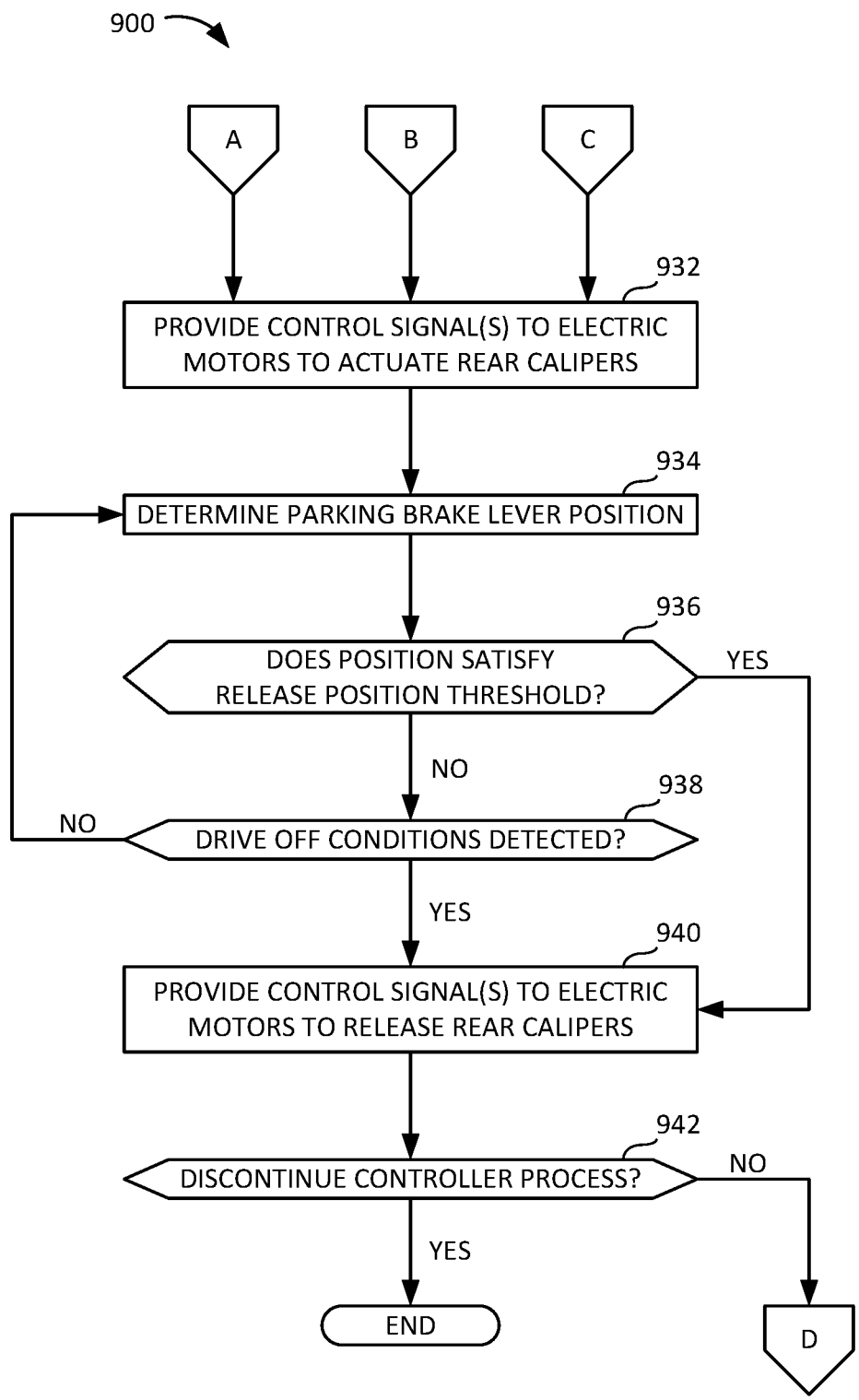

A flowchart representative of an example method for providing braking control signals from the example PEPB controller 140 of FIGS. 1 and 2 to the example PEPB system 100 of FIGS. 1 and 2 and/or the example vehicle 200 of FIG. 2 is shown in FIGS. 9A and 9B. In this example, the method may be implemented using machine-readable instructions that comprise one or more program(s) for execution by a controller or processor such as the example PEPB controller 140 of FIGS. 1 and 2 described above and shown in the example processor platform 1000 discussed below in connection with FIG. 10. The one or more program(s) may be embodied in software stored on a tangible computer readable storage medium such as a CD-ROM, a floppy disk, a hard drive, a digital versatile disk (DVD), a Blu-ray disk, or a memory associated with the PEPB controller 140, but the entire program(s) and/or parts thereof could alternatively be executed by a device other than the PEPB controller 140 and/or embodied in firmware or dedicated hardware. Further, although the example program(s) is/are described with reference to the flowchart illustrated in FIGS. 9A and 9B, many other methods for providing braking control signals from the example PEPB controller 140 of FIGS. 1 and 2 to the example PEPB system 100 of FIGS. 1 and 2 and/or the example vehicle 200 of FIG. 2 may alternatively be used. For example, the order of execution of the blocks may be changed, and/or some of the blocks described may be changed, eliminated, or combined.

As mentioned above, the example method of FIGS. 9A and 9B may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIGS. 9A and 9B may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 9A and 9B are a flowchart representative of an example method 900 that may be executed at the example PEPB controller 140 of FIGS. 1 and 2 to provide braking control signals to the example PEPB system 100 of FIGS. 1 and 2 and/or the example vehicle 200 of FIG. 2. The example method 900 of FIGS. 9A and 9B begins when the PEPB controller 140 of FIGS. 1 and 2 determines a position of the parking brake lever 114 of FIGS. 1-3 (block 920). For example, the PEPB controller 140 may determine at block 902, based on data and/or information sensed, measured and/or detected by the position sensor 138 of FIGS. 1-3, that the parking brake lever 114 is in a position corresponding to the second example position 304 (e.g., thirty degrees (30°)) illustrated in FIG. 3.

The PEPB controller 140 of FIGS. 1 and 2 determines whether the position of the parking brake lever 114 determined at block 902 satisfies (e.g., exceeds) an activation position threshold (block 904). For example, the PEPB controller 140 may determine at block 904 that the second example position 304 (e.g., thirty degrees (30°)) of the parking brake lever 114 determined at block 902 satisfies the activation position threshold 316 (e.g., five degrees (5°) or greater) illustrated in FIG. 3. If the PEPB controller 140 determines at block 904 that the position of the parking brake lever 114 determined at block 902 does not satisfy the activation position threshold 316, control of the example method 900 returns to block 902. If the PEPB controller 140 instead determines at block 904 that the position of the parking brake lever 114 determined at block 902 satisfies the activation position threshold 316, control of the example method 900 proceeds to block 906.

At block 906, the PEPB controller 140 of FIGS. 1 and 2 determines a speed of the vehicle 200 of FIG. 2 (block 906). For example, the PEPB controller 140 may determine at block 906 that the speed of the vehicle 200 is thirty miles per hour (30 mph) based on data and/or information sensed, measured and/or detected by the speed sensor 110 FIGS. 1 and 2.

The PEPB controller 140 of FIGS. 1 and 2 determines whether the speed of the vehicle 200 determined at block 906 satisfies (e.g., exceeds) a speed threshold (block 908). For example, the PEPB controller 140 may determine that the example vehicle speed of thirty miles per hour (30 mph) described above in connection with block 906 satisfies an example speed threshold of one mile per hour (1 mph) and above. If the PEPB controller 140 determines at block 908 that the speed of the vehicle 200 determined at block 906 satisfies the speed threshold, control of the example method 900 proceeds to block 910. If the PEPB controller 140 instead determines at block 908 that the speed of the vehicle 200 determined at block 906 does not satisfy the speed threshold, control of the example method 900 proceeds to block 932.

At block 910, the PEPB controller 140 of FIGS. 1 and 2 determines a driving mode of the vehicle 200 of FIG. 2 (block 910). For example, the PEPB controller 140 may determine at block 910 that the driving mode of the vehicle 200 is a sport mode based on data and/or information sensed, measured and/or detected by the driving mode sensor 112 and/or the user interface 118 of FIGS. 1 and 2.

The PEPB controller 140 of FIGS. 1 and 2 determines whether the driving mode of the vehicle 200 determined at block 910 is a performance mode (block 912). For example, the PEPB controller 140 may determine at block 912 that the example sport mode of the vehicle 200 described above in connection with block 910 is a performance driving mode based on a driving mode correlation table, list and/or matrix (e.g., the driving mode correlation table 802 of FIG. 8). If the PEPB controller 140 determines at block 912 that the driving mode of the vehicle 200 determined at block 910 is not a performance mode, control of the example method 900 proceeds to block 914. If the PEPB controller 140 instead determines at block 912 that the driving mode of the vehicle 200 determined at block 910 is a performance mode, control of the example method 900 proceeds to block 922.

At block 914, the PEPB controller 140 of FIGS. 1 and 2 provides one or more control signal(s) to the HCU 106 of FIGS. 1 and 2 to cause the HCU 106 to actuate the front wheel brake calipers 122 and the rear wheel brake calipers 126 of the PEPB system 100 of FIGS. 1 and 2 and/or the vehicle 200 of FIG. 2 (block 914). For example, the PEPB controller 140 may provide one or more control signal(s) to the HCU 106 that cause the HCU 106 to provide a first hydraulic pressure (e.g., to apply fifteen percent (15%) of the maximum hydraulic pressure) to the front wheel brake calipers 122 and the rear wheel brake calipers 126 of the vehicle 200 based on an activation position correlation table, list and/or matrix (e.g., the activation position correlation table 804 of FIG. 8).

Following block 914, the PEPB controller 140 of FIGS. 1 and 2 determines a speed of the vehicle 200 of FIG. 2 (block 916). For example, the PEPB controller 140 may determine at block 916 that the speed of the vehicle 200 is zero miles per hour (0 mph) based on data and/or information sensed, measured and/or detected by the speed sensor 110 of FIGS. 1 and 2.

The PEPB controller 140 of FIGS. 1 and 2 determines whether the speed of the vehicle 200 determined at block 916 satisfies (e.g., exceeds) a speed threshold (block 918). For example, the PEPB controller 140 may determine that the example vehicle speed of zero miles per hour (0 mph) described above in connection with block 916 does not satisfy the example speed threshold of one mile per hour (1 mph) and above. If the PEPB controller 140 determines at block 918 that the speed of the vehicle 200 determined at block 916 satisfies the speed threshold, control of the example method 900 returns to block 916. If the PEPB controller 140 instead determines at block 918 that the speed of the vehicle 200 determined at block 916 does not satisfy the speed threshold, control of the example method 900 proceeds to block 920.

At block 920, the PEPB controller 140 of FIGS. 1 and 2 provides one or more control signal(s) to the HCU 106 of FIGS. 1 and 2 to cause the HCU 106 to release the front wheel brake calipers 122 and the rear wheel brake calipers 126 of the PEPB system 100 of FIGS. 1 and 2 and/or the vehicle 200 of FIG. 2 (block 920). For example, the PEPB controller 140 may provide one or more control signal(s) to the HCU 106 that cause the HCU 106 to release the first hydraulic pressure (e.g., to apply zero percent (0%) of the maximum hydraulic pressure) from the front wheel brake calipers 122 and the rear wheel brake calipers 126. Following block 920, control of the example method 900 proceeds to block 932.

At block 922, the PEPB controller 140 of FIGS. 1 and 2 provides one or more control signal(s) to the HCU 106 of FIGS. 1 and 2 to cause the HCU 106 to actuate the rear wheel brake calipers 126 of the PEPB system 100 of FIGS. 1 and 2 and/or the vehicle 200 of FIG. 2 based on the position of the parking brake lever 114 determined at block 902 (block 922). For example, the PEPB controller 140 may provide one or more control signal(s) to the HCU 106 that cause the HCU 106 to provide a second hydraulic pressure (e.g., to apply forty percent (40%) of the maximum hydraulic pressure) to the rear wheel brake calipers 126, the second hydraulic pressure being a variable pressure determined by the PEPB controller 140 based on the position (e.g., thirty degrees (30°)) of the parking brake lever 114 and based on an activation position correlation table, list and/or matrix (e.g., the activation position correlation table 804 of FIG. 8).

Following block 922, the PEPB controller 140 of FIGS. 1 and 2 determines a speed of the vehicle 200 of FIG. 2 (block 924). For example, the PEPB controller 140 may determine at block 924 that the speed of the vehicle 200 is twenty miles per hour (20 mph) based on data and/or information sensed, measured and/or detected by the speed sensor 110 of FIGS. 1 and 2.

The PEPB controller 140 of FIGS. 1 and 2 determines whether the speed of the vehicle 200 determined at block 924 satisfies (e.g., exceeds) a speed threshold (block 926). For example, the PEPB controller 140 may determine that the example vehicle speed of twenty miles per hour (20 mph) described above in connection with block 924 satisfies the example speed threshold of one mile per hour (1 mph) and above. If the PEPB controller 140 determines at block 926 that the speed of the vehicle 200 determined at block 924 satisfies the speed threshold, control of the example method 900 proceeds to block 928. If the PEPB controller 140 instead determines at block 926 that the speed of the vehicle 200 determined at block 924 does not satisfy the speed threshold, control of the example method 900 proceeds to block 930.

At block 928, the PEPB controller 140 of FIGS. 1 and 2 determines a position of the parking brake lever 114 of FIGS. 1-3 (block 928). For example, the PEPB controller 140 may determine at block 928, based on data and/or information sensed, measured and/or detected by the position sensor 138 of FIGS. 1-3, that the parking brake lever 114 is in a position corresponding to the third example position 306 (e.g., sixty degrees (60°)) illustrated in FIG. 3. Following block 928, control of the example method 900 returns to block 922. Accordingly, the PEPB controller 140 will repeat the process of providing one or more control signal(s) to the HCU 106 to cause the HCU 106 to actuate the rear wheel brake calipers 126 of the PEPB system 100 of FIGS. 1 and 2 and/or the vehicle 200 of FIG. 2 based on the position(s) of the parking brake lever 114 determined at block 928 and based on the activation position correlation table, list and/or matrix (e.g., the activation position correlation table 804 of FIG. 8).

At block 930, the PEPB controller 140 of FIGS. 1 and 2 provides one or more control signal(s) to the HCU 106 of FIGS. 1 and 2 to cause the HCU 106 to release the rear wheel brake calipers 126 of the PEPB system 100 of FIGS. 1 and 2 and/or the vehicle 200 of FIG. 2 (block 930). For example, the PEPB controller 140 may provide one or more control signal(s) to the HCU 106 that cause the HCU 106 to release the second hydraulic pressure (e.g., to apply zero percent (0%) of the maximum hydraulic pressure) from the rear wheel brake calipers 126. Following block 930, control of the example method 900 proceeds to block 932.

At block 932, the PEPB controller 140 of FIGS. 1 and 2 provides one or more control signal(s) to the rear wheel brake caliper electric motors 128 of FIGS. 1 and 2 to cause the rear wheel brake caliper electric motors 128 to actuate the rear wheel brake calipers 126 of the PEPB system 100 of FIGS. 1 and 2 and/or the vehicle 200 of FIG. 2 (block 932). For example, the PEPB controller 140 may provide one or more control signal(s) to the rear wheel brake caliper electric motors 128 that cause the rear wheel brake caliper electric motors 128 to provide a clamping force (e.g., to apply one hundred percent (100%) of the maximum clamping force) to the rear wheel brake calipers 126 based on an activation position correlation table, list and/or matrix (e.g., the activation position correlation table 804 of FIG. 8).

Following block 932, the PEPB controller 140 of FIGS. 1 and 2 determines a position of the parking brake lever 114 of FIGS. 1-3 (block 934). For example, the PEPB controller 140 may determine at block 934, based on data and/or information sensed, measured and/or detected by the position sensor 138 of FIGS. 1-3, that the parking brake lever 114 is in a position corresponding to the fourth example position 308 (e.g., negative ten degrees (−10°)) illustrated in FIG. 3.

The PEPB controller 140 of FIGS. 1 and 2 determines whether the position of the parking brake lever 114 determined at block 934 satisfies (e.g., is less than) a release position threshold (block 936). For example, the PEPB controller 140 may determine at block 936 that the fourth example position 308 (e.g. negative ten degrees (−10°)) of the parking brake lever 114 determined at block 934 satisfies the release position threshold 318 (e.g., negative five degrees (−5°) or less) illustrated in FIG. 3. If the PEPB controller 140 determines at block 936 that the position of the parking brake lever 114 determined at block 934 does not satisfy the release position threshold 318, control of the example method 900 proceeds to block 938. If the PEPB controller 140 instead determines at block 936 that the position of the parking brake lever 114 determined at block 934 satisfies the release position threshold 318, control of the example method 900 proceeds to block 940.

At block 938, the PEPB controller 140 of FIGS. 1 and 2 determines whether drive off conditions have been detected (block 938). For example, the PEPB controller 140 may determine that drive off conditions (e.g., ignition of vehicle turned on, accelerator pedal of vehicle depressed, transmission of vehicle in drive, etc.) have been detected by one or more sensor(s) and/or electric control module(s) of the vehicle 200 of FIG. 2 in communication with the PEPB controller 140 and/or the PEPB control module 116. If the PEPB controller 140 determines at block 938 that drive off conditions have not been detected, control of the example method 900 returns to block 934. If the PEPB controller 140 instead determines at block 938 that drive off conditions have been detected, control of the example method 900 proceeds to block 940.

At block 940, the PEPB controller 140 of FIGS. 1 and 2 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2 (block 940). For example, the PEPB controller 140 may provide one or more control signal(s) to the rear wheel brake caliper electric motors 128 that cause the rear wheel brake caliper electric motors 128 to release the clamping force (e.g., to apply zero percent (0%) of the maximum clamping force) from the rear wheel brake calipers 126 based on a release position correlation table, list and/or matrix (e.g., the release position correlation table 806 of FIG. 8).

Following block 940, the PEPB controller 140 of FIGS. 1 and 2 determines whether to discontinue the process by which the PEPB controller 140 manages and/or implements the PEPB system 100 of FIGS. 1 and 2 (block 942). For example, the PEPB controller 140 may obtain and/or receive data, information and/or signal(s) from one or more sensor (s) and/or electric control module(s) of the vehicle 200 of FIG. 2 indicating that the process by which the PEPB controller 140 manages and/or implements the PEPB system 100 of the vehicle 200 should be discontinued. If the PEPB controller 140 determines at block 942 that the process by which the PEPB controller 140 manages and/or implements the PEPB system 100 should not be discontinued, control of the example method 900 returns to block 902. If the PEPB controller 140 instead determines at block 942 that the process by which the PEPB controller 140 manages and/or implements the PEPB system 100 should be discontinued, the example method 900 ends.

Figure 10:
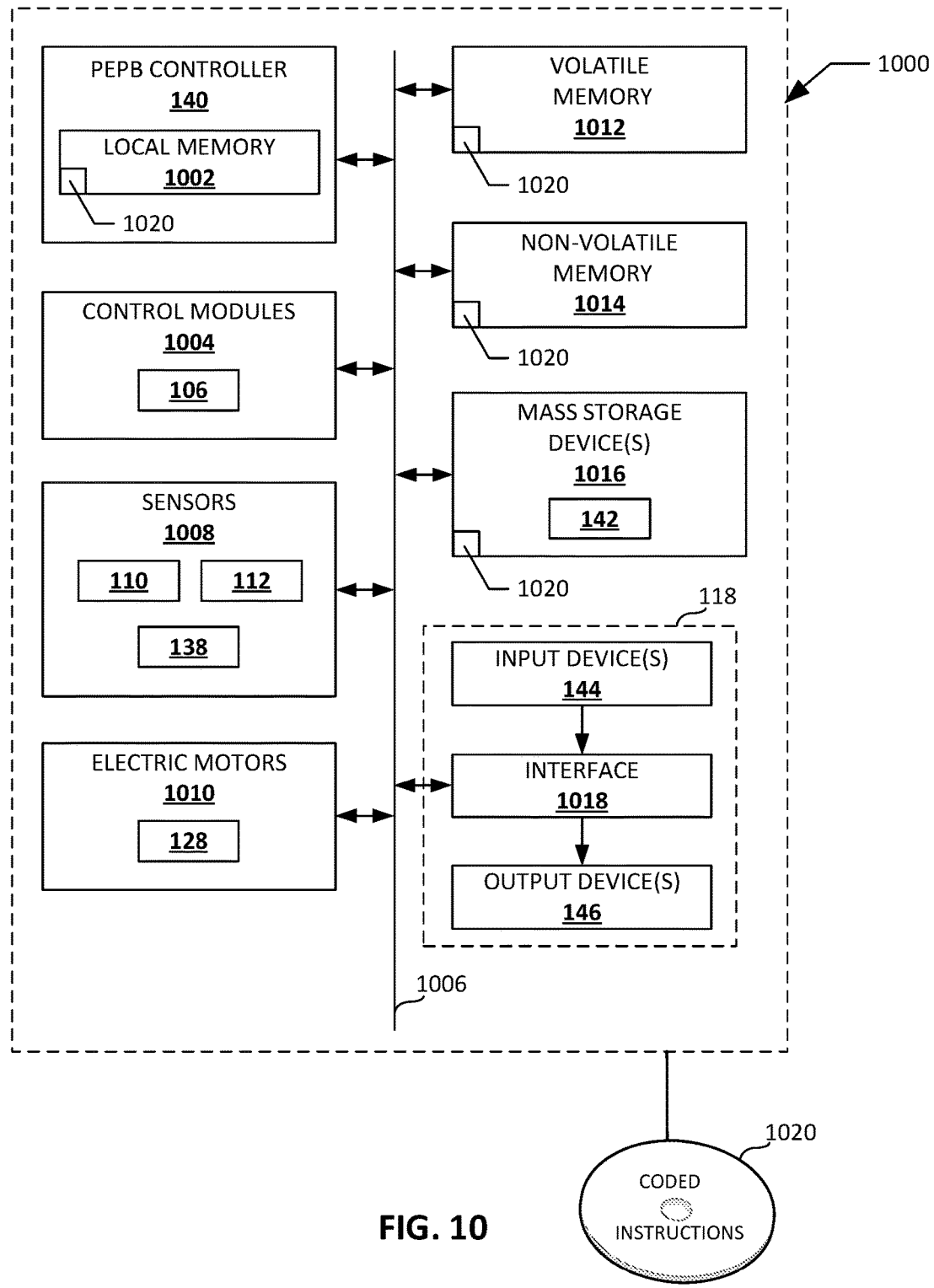
FIG. 10 is an example processor platform capable of executing instructions to implement the method of FIGS. 9A and 9B and the example PEPB system of FIGS. 1 and 2.

FIG. 10 is an example processor platform 1000 capable of executing instructions to implement the method of FIGS. 9A and 9B and the example PEPB system 100 of FIGS. 1 and 2. The processor platform 1000 of the illustrated example includes the PEPB controller 140. The PEPB controller 140 of the illustrated example is hardware. For example, the PEPB controller 140 can be implemented by one or more integrated circuits, logic circuits, microprocessors or controllers from any desired family or manufacturer. The PEPB controller 140 of the illustrated example includes a local memory 1002 (e.g., a cache).

The PEPB controller 140 of the illustrated example is in communication with one or more example control module(s) 1004 via a bus 1006 (e.g., a controller area network (CAN) bus). The example control module(s) 1004 include the example HCU 106 of FIGS. 1 and 2. The PEPB controller 140 of the illustrated example is also in communication with one or more example sensor(s) 1008 via the bus 1006. The example sensor(s) 1008 include the example speed sensor 110, the example driving mode sensor 112 and the example position sensor 138 of FIGS. 1 and 2. The PEPB controller 140 of the illustrated example is also in communication with one or more electric motor(s) 1010 via the bus 1006. The example electric motor(s) 1010 include the example rear wheel brake caliper electric motors 128 of FIGS. 1 and 2.

The PEPB controller 140 of the illustrated example is also in communication with a main memory including a volatile memory 1012 and a non-volatile memory 1014 via the bus 1006. The volatile memory 1012 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1014 may be implemented by flash memory and/or any other desired type of memory device. Access to the volatile memory 1012 and the non-volatile memory 1014 is controlled by a memory controller.

The PEPB controller 140 of the illustrated example is also in communication with one or more mass storage device(s) 1016 for storing software and/or data. Example mass storage device(s) 1016 include floppy disk drives, hard drive disks, compact disk drives, Blu-ray disk drives, RAID systems, and digital versatile disk (DVD) drives. In the illustrated example, the mass storage device 1016 includes the example PEPB memory 142 of FIGS. 1 and 2.

The processor platform 1000 of the illustrated example also includes an interface circuit 1018. The interface circuit 1018 may be implemented by any type of interface standard, such as an Ethernet interface, a universal serial bus (USB), and/or a PCI express interface. In the illustrated example, one or more input device(s) 144 are connected to the interface circuit 1018. The input device(s) 144 permit(s) a user to enter data and commands into the PEPB controller 140. The input device(s) 144 can be implemented by, for example, an audio sensor, a camera (still or video), a keypad, a touchscreen, a track-pad, a trackball, isopoint, a voice recognition system, a button, a microphone, and/or a liquid crystal display. One or more output device(s) 146 are also connected to the interface circuit 1018 of the illustrated example. The output device(s) 146 can be implemented, for example, by a light emitting diode, an organic light emitting diode, a liquid crystal display, a touchscreen and/or a speaker. The interface circuit 1018 of the illustrated example may, thus, include a graphics driver such as a graphics driver chip and/or processor. In the illustrated example, the input device(s) 144, the output device(s) 146 and the interface circuit 1018 collectively form the example user interface 118 of FIGS. 1 and 2.

Coded instructions 1020 for implementing the method of FIGS. 9A and 9B may be stored in the local memory 1002, in the volatile memory 1012, in the non-volatile memory 1014, in the mass storage device 1016, and/or on a removable tangible computer readable storage medium such as a CD or DVD.

From the foregoing, it will be appreciated that the disclosed PEPB controllers and/or PEPB systems advantageously provide performance-based driving characteristics traditionally associated with mechanical parking brake systems. For example, the disclosed PEPB controllers and/or PEPB systems advantageously provide for a driver of a vehicle who selects a performance-based driving mode for the vehicle to control the application of variable braking forces to the rear wheels of the vehicle via a driver-positionable parking brake lever in communication with the PEPB controller of the PEPB system.

The disclosed PEPB systems also advantageously include a parking brake lever having different rates of resistance associated with different ranges of movement of the parking brake lever. Implementation of the different rates of resistance advantageously enables the parking brake lever to provide a user (e.g., a driver) applying a force (e.g., pushing or pulling) to a free end of the parking brake lever with tactile and/or haptic feedback and/or control information corresponding to the specific position of the parking brake lever relative to the available range of motion of the parking brake lever, and/or corresponding to engagement of the PEPB system In some disclosed examples, an apparatus comprises a controller configured to electromechanically actuate rear brake calipers of a vehicle in response to a first set of operating conditions of the vehicle, to hydraulically actuate front brake calipers and the rear brake calipers of the vehicle in response to a second set of operating conditions of the vehicle, and to hydraulically actuate only the rear brake calipers in response to a third set of operating conditions of the vehicle. In some disclosed examples the first set of operating conditions includes a position of a parking brake lever of the vehicle satisfying a position threshold and a speed of the vehicle not satisfying a speed threshold. In some disclosed examples, the second set of operating conditions includes the position satisfying the position threshold, the speed satisfying the speed threshold and a driving mode of the vehicle being a non-performance mode. In some disclosed examples, the third set of operating conditions includes the position satisfying the position threshold, the speed satisfying the speed threshold and the driving mode being a performance mode. In some disclosed examples, the performance mode is one of a sport mode or a track mode, and the non-performance mode is one of a normal mode, a comfort mode, or an economy mode.

In some disclosed examples, the controller is configured to electromechanically actuate the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers. In some disclosed examples, the controller is configured to hydraulically actuate the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers. In some disclosed examples, the controller is configured to hydraulically actuate only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

In some disclosed examples, the controller is configured to provide a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers. In some disclosed examples, the controller is configured to provide a fifth control signal to the electric motors, the fifth control signal to cause the electric motors to provide the clamping force to the rear wheels of the vehicle via the rear brake calipers.

In some disclosed examples, the position of the parking brake lever is a first position of the parking brake lever, the position threshold is an activation position threshold, and the controller is configured to provide a sixth control signal to the electric motors in response to determining, following the first control signal, that the parking brake lever is in a second position that satisfies a release position threshold, the sixth control signal to cause the electric motors to release the clamping force from the rear wheels via the rear brake calipers. In some disclosed examples, the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

In some disclosed examples, a method for controlling an electric parking brake system of a vehicle comprises electromechanically actuating, by executing one or more instructions with a controller, rear brake calipers of the vehicle in response to a first set of operating conditions of the vehicle, hydraulically actuating, by executing one or more instructions with the controller, front brake calipers and the rear brake calipers of the vehicle in response to a second set of operating conditions of the vehicle, and hydraulically actuating, by executing one or more instructions with the controller, only the rear brake calipers in response to a third set of operating conditions of the vehicle. In some disclosed examples, the first set of operating conditions includes a position of a parking brake lever of the vehicle satisfying a position threshold and a speed of the vehicle not satisfying a speed threshold. In some disclosed examples, the second set of operating conditions includes the position satisfying the position threshold, the speed satisfying the speed threshold and a driving mode of the vehicle being a non-performance mode. In some disclosed examples, the third set of operating conditions includes the position satisfying the position threshold, the speed satisfying the speed threshold and the driving mode being a performance mode. In some disclosed examples, the performance mode is one of a sport mode or a track mode, and wherein the non-performance mode is one of a normal mode, a comfort mode, or an economy mode.

In some disclosed examples, the method includes electromechanically actuating the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers. In some disclosed examples, the method includes hydraulically actuating the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers. In some disclosed examples, the method includes hydraulically actuating only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

In some disclosed examples, the method further comprises providing, by executing one or more instructions with the controller, a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers. In some disclosed examples, the method further comprises providing, by executing one or more instructions with the controller, a fifth control signal to the electric motors, the fifth control signal to cause the electric motors to provide the clamping force to the rear wheels of the vehicle via the rear brake calipers.

In some disclosed examples, the position is a first position of the parking brake lever, the position threshold is an activation position threshold, and the method further comprises providing, by executing one or more instructions with the controller, a sixth control signal to the electric motors in response to determining, following the first control signal, that the parking brake lever is in a second position that satisfies a release position threshold, the sixth control signal to cause the electric motors to release the clamping force from the rear wheels via the rear brake calipers. In some disclosed examples, the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

In some disclosed examples, a tangible machine readable storage medium comprises instructions that, when executed, cause a controller to electromechanically actuate rear brake calipers of a vehicle in response to a first set of operating conditions of the vehicle, to hydraulically actuate front brake calipers and the rear brake calipers of the vehicle in response to a second set of operating conditions of the vehicle, and to hydraulically actuate only the rear brake calipers in response to a third set of operating conditions of the vehicle. In some disclosed examples the first set of operating conditions includes a position of a parking brake lever of the vehicle satisfying a position threshold and a speed of the vehicle not satisfying a speed threshold. In some disclosed examples, the second set of operating conditions includes the position satisfying the position threshold, the speed satisfying the speed threshold and a driving mode of the vehicle being a non-performance mode. In some disclosed examples, the third set of operating conditions includes the position satisfying the position threshold, the speed satisfying the speed threshold and the driving mode being a performance mode. In some disclosed examples, the performance mode is one of a sport mode or a track mode, and the non-performance mode is one of a normal mode, a comfort mode, or an economy mode.

In some disclosed examples, the instructions, when executed, cause the controller to electromechanically actuate the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers. In some disclosed examples, the instructions, when executed, cause the controller to hydraulically actuate the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers. In some disclosed examples, the instructions, when executed, cause the controller to hydraulically actuate only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

In some disclosed examples, the instructions, when executed, cause the controller to provide a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers. In some disclosed examples, the instructions, when executed, cause the controller to provide a fifth control signal to the electric motors, the fifth control signal to cause the electric motors to provide the clamping force to the rear wheels of the vehicle via the rear brake calipers.

In some disclosed examples, the position of the parking brake lever is a first position of the parking brake lever, the position threshold is an activation position threshold, and the instructions, when executed, cause the controller to provide a sixth control signal to the electric motors in response to determining, following the first control signal, that the parking brake lever is in a second position that satisfies a release position threshold, the sixth control signal to cause the electric motors to release the clamping force from the rear wheels via the rear brake calipers. In some disclosed examples, the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

In some disclosed examples, an apparatus comprises a parking brake lever. In some disclosed examples, the parking brake lever has a first rate of resistance associated with moving the parking brake lever in a first direction away from a neutral position, and a second rate of resistance associated with moving the parking brake lever in a second direction away from the neutral position opposite the first direction. In some disclosed examples, the second rate of resistance is different from the first rate of resistance. In some disclosed examples, the apparatus further comprises a controller to be controlled based on a position of the parking brake lever. In some disclosed examples, the controller is configured to electromechanically actuate rear brake calipers of a vehicle in response to a first set of operating conditions of the vehicle. In some disclosed examples, the controller is further configured to hydraulically actuate front brake calipers and the rear brake calipers of the vehicle in response to a second set of operating conditions of the vehicle. In some disclosed examples, the controller is further configured to hydraulically actuate only the rear brake calipers in response to a third set of operating conditions of the vehicle.

In some disclosed examples of the apparatus, the parking brake lever is biased to the neutral position. In some disclosed examples, the second rate of resistance is greater than the first rate of resistance.

In some disclosed examples of the apparatus, the parking brake lever further includes a third rate of resistance associated with moving the parking brake lever away from the neutral position in the first direction. In some disclosed examples, the third rate of resistance is different from the first rate of resistance. In some disclosed examples, the third rate of resistance is greater than the first rate of resistance. In some disclosed examples, the first rate of resistance is associated with moving the parking brake lever away from the neutral position in the first direction along a first range of motion of the parking brake lever, and the third rate of resistance is associated with moving the parking brake lever away from the neutral position in the first direction along a second range of motion of the parking brake lever. In some disclosed examples, the second range of motion is different from the first range of motion.

In some disclosed examples of the apparatus, the parking brake lever further includes a fourth rate of resistance associated with moving the parking brake lever away from the neutral position in the first direction. In some disclosed examples, the fourth rate of resistance is different from the third rate of resistance.

In some disclosed examples of the apparatus, the third rate of resistance is less than the first rate of resistance, the fourth rate of resistance is greater than the third rate of resistance, and the third rate of resistance corresponds to a mechanical detent encountered by the parking brake lever as the parking brake lever moves in the first direction. In some disclosed examples, the first rate of resistance is associated with moving the parking brake lever away from the neutral position in the first direction along a first range of motion of the parking brake lever, the third rate of resistance is associated with moving the parking brake lever away from the neutral position in the first direction along a second range of motion of the parking brake lever, and the fourth rate of resistance is associated with moving the parking brake lever away from the neutral position in the first direction along a third range of motion of the parking brake lever. In some disclosed examples, the second range of motion is different from the first range of motion, and the third range of motion is different from the second range of motion and the first range of motion.

In some disclosed examples of the apparatus, the third rate of resistance is greater than the first rate of resistance, the fourth rate of resistance is less than the third rate of resistance, the third rate of resistance is associated with attempting to move the parking brake lever in the first direction beyond a first position when an actuatable mechanical lock of the parking brake lever has not been actuated, and the fourth rate of resistance is associated with moving the parking brake lever in the first direction beyond the first position when the actuatable mechanical lock of the parking brake lever has been actuated. In some disclosed examples, the first rate of resistance is associated with moving the parking brake lever away from the neutral position in the first direction along a first range of motion of the parking brake lever, and the fourth rate of resistance is associated with moving the parking brake lever away from the neutral position in the first direction along a second range of motion of the parking brake lever. In some disclosed examples, the second range of motion is different from the first range of motion.

In some examples, a method for controlling an electric parking brake system of a vehicle based on a position of a parking brake lever is disclosed. In some disclosed examples, the method comprises providing a first rate of resistance in response to moving the parking brake lever in a first direction away from a neutral position. In some disclosed examples, the method further comprises providing a second rate of resistance in response to moving the parking brake lever in a second direction away from the neutral position opposite the first direction. In some disclosed examples, the second rate of resistance is different from the first rate of resistance. In some disclosed examples, the method further comprises electromechanically actuating, by executing one or more instructions with a controller, rear brake calipers of the vehicle in response to a first set of operating conditions of the vehicle. In some disclosed examples, the method further comprises hydraulically actuating, by executing one or more instructions with the controller, front brake calipers and the rear brake calipers of the vehicle in response to a second set of operating conditions of the vehicle. In some disclosed examples, the method further comprises hydraulically actuating, by executing one or more instructions with the controller, only the rear brake calipers in response to a third set of operating conditions of the vehicle.

In some disclosed examples of the method, the parking brake lever is biased to the neutral position. In some disclosed examples, the second rate of resistance is greater than the first rate of resistance.

In some disclosed examples, the method further comprises providing a third rate of resistance in response to moving the parking brake lever away from the neutral position in the first direction. In some disclosed examples, the third rate of resistance is different from the first rate of resistance. In some disclosed examples, the third rate of resistance is greater than the first rate of resistance. In some disclosed examples, the first rate of resistance is provided in response to moving the parking brake lever away from the neutral position in the first direction along a first range of motion of the parking brake lever, and the third rate of resistance is provided in response to moving the parking brake lever away from the neutral position in the first direction along a second range of motion of the parking brake lever. In some disclosed examples, the second range of motion being different from the first range of motion.

In some disclosed examples, the method further comprises providing a fourth rate of resistance in response to moving the parking brake lever away from the neutral position in the first direction. In some disclosed examples, the fourth rate of resistance is different from the third rate of resistance.

In some disclosed examples of the method, the third rate of resistance is less than the first rate of resistance, the fourth rate of resistance is greater than the third rate of resistance, and the third rate of resistance corresponds to a mechanical detent encountered by the parking brake lever as the parking brake lever moves in the first direction. In some disclosed examples, the first rate of resistance is provided in response to moving the parking brake lever away from the neutral position in the first direction along a first range of motion of the parking brake lever, the third rate of resistance is provided in response to moving the parking brake lever away from the neutral position in the first direction along a second range of motion of the parking brake lever, and the fourth rate of resistance is provided in response to moving the parking brake lever away from the neutral position in the first direction along a third range of motion of the parking brake lever. In some disclosed examples, the second range of motion is different from the first range of motion, and the third range of motion is different from the second range of motion and the first range of motion.

In some disclosed examples of the method, the third rate of resistance is greater than the first rate of resistance, the fourth rate of resistance is less than the third rate of resistance, the third rate of resistance is provided in response to attempting to move the parking brake lever in the first direction beyond a first position when an actuatable mechanical lock of the parking brake lever has not been actuated, and the fourth rate of resistance is provided in response to moving the parking brake lever in the first direction beyond the first position when the actuatable mechanical lock of the parking brake lever has been actuated. In some disclosed examples, the first rate of resistance is provided in response to moving the parking brake lever away from the neutral position in the first direction along a first range of motion of the parking brake lever, and the fourth rate of resistance is provided in response to moving the parking brake lever away from the neutral position in the first direction along a second range of motion of the parking brake lever. In some disclosed examples, the second range of motion is different from the first range of motion.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a parking brake lever having a first rate of resistance associated with moving the parking brake lever in a first direction away from a neutral position, and a second rate of resistance associated with moving the parking brake lever in a second direction away from the neutral position opposite the first direction, the second rate of resistance being different from the first rate of resistance; and
a controller to be controlled based on a position of the parking brake lever, the controller configured to:
electromechanically actuate rear brake calipers of a vehicle in response to a first set of operating conditions of the vehicle;
hydraulically actuate front brake calipers and the rear brake calipers of the vehicle in response to a second set of operating conditions of the vehicle; and
hydraulically actuate only the rear brake calipers in response to a third set of operating conditions of the vehicle.

2. The apparatus of claim 1, wherein the parking brake lever is biased to the neutral position.

3. The apparatus of claim 1, wherein the second rate of resistance is greater than the first rate of resistance.

4. The apparatus of claim 1, wherein the parking brake lever further includes a third rate of resistance associated with moving the parking brake lever away from the neutral position in the first direction, the third rate of resistance being different from the first rate of resistance.

5. The apparatus of claim 4, wherein the third rate of resistance is greater than the first rate of resistance.

6. The apparatus of claim 4, wherein the first rate of resistance is associated with moving the parking brake lever away from the neutral position in the first direction along a first range of motion of the parking brake lever, and the third rate of resistance is associated with moving the parking brake lever away from the neutral position in the first direction along a second range of motion of the parking brake lever, the second range of motion being different from the first range of motion.

7. The apparatus of claim 4, wherein the parking brake lever further includes a fourth rate of resistance associated with moving the parking brake lever away from the neutral position in the first direction, the fourth rate of resistance being different from the third rate of resistance.

8. The apparatus of claim 7, wherein the third rate of resistance is less than the first rate of resistance, the fourth rate of resistance is greater than the third rate of resistance, and the third rate of resistance corresponds to a mechanical detent encountered by the parking brake lever as the parking brake lever moves in the first direction.

9. The apparatus of claim 8, wherein the first rate of resistance is associated with moving the parking brake lever away from the neutral position in the first direction along a first range of motion of the parking brake lever, the third rate of resistance is associated with moving the parking brake lever away from the neutral position in the first direction along a second range of motion of the parking brake lever, and the fourth rate of resistance is associated with moving the parking brake lever away from the neutral position in the first direction along a third range of motion of the parking brake lever, the second range of motion being different from the first range of motion, the third range of motion being different from the second range of motion and the first range of motion.

10. The apparatus of claim 7, wherein the third rate of resistance is greater than the first rate of resistance, the fourth rate of resistance is less than the third rate of resistance, the third rate of resistance is associated with attempting to move the parking brake lever in the first direction beyond a first position when an actuatable mechanical lock of the parking brake lever has not been actuated, and the fourth rate of resistance is associated with moving the parking brake lever in the first direction beyond the first position when the actuatable mechanical lock of the parking brake lever has been actuated.

11. The apparatus of claim 10, wherein the first rate of resistance is associated with moving the parking brake lever away from the neutral position in the first direction along a first range of motion of the parking brake lever, and the fourth rate of resistance is associated with moving the parking brake lever away from the neutral position in the first direction along a second range of motion of the parking brake lever, the second range of motion being different from the first range of motion.

12. A method for controlling an electric parking brake system of a vehicle based on a position of a parking brake lever, the method comprising:
providing a first rate of resistance in response to moving the parking brake lever in a first direction away from a neutral position;
providing a second rate of resistance in response to moving the parking brake lever in a second direction away from the neutral position opposite the first direction, the second rate of resistance being different from the first rate of resistance;
electromechanically actuating, by executing one or more instructions with a controller, rear brake calipers of the vehicle in response to a first set of operating conditions of the vehicle;
hydraulically actuating, by executing one or more instructions with the controller, front brake calipers and the rear brake calipers of the vehicle in response to a second set of operating conditions of the vehicle; and
hydraulically actuating, by executing one or more instructions with the controller, only the rear brake calipers in response to a third set of operating conditions of the vehicle.

13. The method of claim 12, wherein the parking brake lever is biased to the neutral position.

14. The method of claim 12, further comprising providing a third rate of resistance in response to moving the parking brake lever away from the neutral position in the first direction, the third rate of resistance being different from the first rate of resistance.

15. The method of claim 14, wherein the first rate of resistance is provided in response to moving the parking brake lever away from the neutral position in the first direction along a first range of motion of the parking brake lever, and the third rate of resistance is provided in response to moving the parking brake lever away from the neutral position in the first direction along a second range of motion of the parking brake lever, the second range of motion being different from the first range of motion.

16. The method of claim 14, further comprising providing a fourth rate of resistance in response to moving the parking brake lever away from the neutral position in the first direction, the fourth rate of resistance being different from the third rate of resistance.

17. The method of claim 16, wherein the third rate of resistance is less than the first rate of resistance, the fourth rate of resistance is greater than the third rate of resistance, and the third rate of resistance corresponds to a mechanical detent encountered by the parking brake lever as the parking brake lever moves in the first direction.

18. The method of claim 17, wherein the first rate of resistance is provided in response to moving the parking brake lever away from the neutral position in the first direction along a first range of motion of the parking brake lever, the third rate of resistance is provided in response to moving the parking brake lever away from the neutral position in the first direction along a second range of motion of the parking brake lever, and the fourth rate of resistance is provided in response to moving the parking brake lever away from the neutral position in the first direction along a third range of motion of the parking brake lever, the second range of motion being different from the first range of motion, the third range of motion being different from the second range of motion and the first range of motion.

19. The method of claim 16, wherein the third rate of resistance is greater than the first rate of resistance, the fourth rate of resistance is less than the third rate of resistance, the third rate of resistance is provided in response to attempting to move the parking brake lever in the first direction beyond a first position when an actuatable mechanical lock of the parking brake lever has not been actuated, and the fourth rate of resistance is provided in response to moving the parking brake lever in the first direction beyond the first position when the actuatable mechanical lock of the parking brake lever has been actuated.

20. The method of claim 19, wherein the first rate of resistance is provided in response to moving the parking brake lever away from the neutral position in the first direction along a first range of motion of the parking brake lever, and the fourth rate of resistance is provided in response to moving the parking brake lever away from the neutral position in the first direction along a second range of motion of the parking brake lever, the second range of motion being different from the first range of motion.

* * * * *